United States Patent
Griffiths et al.

(10) Patent No.: US 8,328,904 B2
(45) Date of Patent: Dec. 11, 2012

(54) METHOD AND SYSTEM FOR CONTROL OF DESICCANT DEHUMIDIFIER

(75) Inventors: William C. Griffiths, Palm Beach Gardens, FL (US); Deepak Pahwa, Delhi (IN); Rajan Sachdev, Delhi (IN)

(73) Assignees: Bry-Air, Inc., Sunbury, OH (US); Bry-Air (Asia) Pvt. Ltd., Delhi (IN)

( * ) Notice: Subject to any disclaimer, the term of this patent is extended or adjusted under 35 U.S.C. 154(b) by 261 days.

(21) Appl. No.: 12/772,367

(22) Filed: May 3, 2010

(65) Prior Publication Data
US 2010/0275775 A1 Nov. 4, 2010

Related U.S. Application Data

(60) Provisional application No. 61/175,119, filed on May 4, 2009.

(51) Int. Cl.
*B01D 53/06* (2006.01)
(52) U.S. Cl. ............... 95/10; 95/26; 95/113; 96/115; 96/116; 96/125
(58) Field of Classification Search ........... 95/10, 18, 95/113, 92; 96/111, 112, 125, 126, 118, 96/115, 113, 123; 62/94, 176.6, 271, 159, 62/160, 180
See application file for complete search history.

(56) References Cited

U.S. PATENT DOCUMENTS

| | | | |
|---|---|---|---|
| 4,012,206 A * | 3/1977 | Macriss et al. ............... 95/113 |
| 4,134,743 A * | 1/1979 | Macriss et al. ............... 95/113 |
| 4,391,616 A * | 7/1983 | Imamura ............... 95/92 |
| 4,402,717 A * | 9/1983 | Izumo et al. ............... 96/118 |
| 4,529,420 A * | 7/1985 | Norback ............... 96/123 |
| 4,589,892 A * | 5/1986 | Leonard ............... 96/115 |
| 4,696,167 A * | 9/1987 | Matsui et al. ............... 62/180 |
| 4,701,189 A * | 10/1987 | Oliker ............... 95/113 |
| 4,729,774 A * | 3/1988 | Cohen et al. ............... 96/123 |
| 4,730,461 A * | 3/1988 | Meckler ............... 62/159 |
| 4,739,624 A * | 4/1988 | Meckler ............... 62/160 |
| 4,795,088 A * | 1/1989 | Kobayashi et al. ......... 236/49.3 |
| 4,887,438 A | 12/1989 | Meckler |
| 4,926,618 A | 5/1990 | Ratliff |
| 4,951,191 A * | 8/1990 | Hiroi et al. ............... 700/45 |
| 6,003,327 A | 12/1999 | Belding et al. |
| 6,141,979 A | 11/2000 | Dunlap |
| 6,199,388 B1 | 3/2001 | Fischer, Jr. |

(Continued)

FOREIGN PATENT DOCUMENTS
JP 4048137 A 2/1992

(Continued)

OTHER PUBLICATIONS
Written Opinion of the European International Searching Authority for Indian PCT application published as WO2010/12855 A1.

(Continued)

*Primary Examiner* — Duane Smith
*Assistant Examiner* — Minh-Chau Pham
(74) *Attorney, Agent, or Firm* — Wood, Herron & Evans, LLP

(57) ABSTRACT

An active wheel desiccant dehumidifier is controlled for improved energy savings by modulating operation characteristics including process air flow, reactivation air flow, temperatures, and wheel rotation in response to changing conditions.

109 Claims, 18 Drawing Sheets

U.S. PATENT DOCUMENTS

| | | |
|---|---|---|
| 7,155,318 B2 | 12/2006 | Sharma et al. |
| 7,178,355 B2 | 2/2007 | Moffitt |
| 7,338,548 B2 | 3/2008 | Boutall |
| 7,340,906 B2 | 3/2008 | Moffitt |
| 2005/0204914 A1 | 9/2005 | Boutall |
| 2006/0117781 A1 | 6/2006 | Moffitt |
| 2007/0051243 A1 | 3/2007 | Boutall et al. |
| 2007/0113573 A1 | 5/2007 | Moffitt |
| 2007/0205297 A1 | 9/2007 | Finkam et al. |
| 2007/0266726 A1 | 11/2007 | Tada et al. |
| 2008/0108295 A1 | 5/2008 | Fischer et al. |
| 2009/0020173 A1 | 1/2009 | Lau et al. |

FOREIGN PATENT DOCUMENTS

| | | |
|---|---|---|
| WO | 2004/055443 A1 | 7/2004 |
| WO | 2006016989 A1 | 2/2006 |
| WO | 2010/128522 A1 | 11/2010 |

OTHER PUBLICATIONS

Japanese Abstract No. 4048137 Published Feb. 18, 1992.

* cited by examiner

WORKING PRINCIPLE OF DESICCANT DEHUMIDIFICATION WHEEL
WITH AN ADDITIONAL PAIR OF PURGE SECTORS

TYPICAL SECTORAL DIVISION OF A DESICCANT WHEEL
WITH AN ADDITIONAL PAIR OF SECTORS

WORKING PRINCIPLE OF DESICCANT DEHUMIDIFICATION WHEEL
WITH AN ADDITIONAL TWO PAIRS OF PURGE SECTORS

TYPICAL SECTORAL DIVISION OF A DESICCANT
WHEEL WITH AN ADDITIONAL PAIR OF SECTORS

TYPICAL FLOW CHARTS FOR SPACE DEHUMIDIFICATION SYSTEM

TYPICAL FLOW CHART FOR PRODUCT DRYNG

METHOD AND SYSTEM FOR CONTROL OF DESICCANT DEHUMIDIFIER

RELATED APPLICATION

The present application claims the benefit of U.S. Ser. No. 61/175,119 filed May 4, 2009, the disclosure of which is hereby incorporated herein by reference in its entirety. This application is also related to a PCT application filed in India, and an Indian National application, for both of which the disclosure is hereby incorporated herein by reference in its entirety, both filed on or before May 3, 2010. First named inventor in both applications is Deepak Pahwa. This application is also related to Mexican national application and a Canadian national application both planned to be filed on or about May 4, 2010 with first named inventor William C. Griffiths, same as the first named inventor in the present application. The PCT Application, Indian National Application, Mexican National Application, Canadian National Application, and present application all have the same three inventors.

FIELD OF THE INVENTION

The present invention relates generally to heating, ventilating, and air-conditioning (HVAC) systems and methods, and process drying system and methods, and more specifically to air conditioning or dehumidification or drying systems that incorporate a thermally activated desiccant wheel. The present invention also provides an improved method for conservation/reduction of energy consumed while using desiccant wheel systems.

BACKGROUND

Desiccant wheels and energy recovery wheels are two types of wheels used in HVAC, or for conditioning process air. Desiccant wheels are used to transfer moisture from one air stream to another. Desiccant wheels are of two types: "active" and "passive".

"Active" desiccant wheels use an external heat source to heat one of the air streams, to reactivate/regenerate a portion of the wheel. "Active" desiccant wheels have been generally used for industrial applications requiring high moisture removal, but are being increasingly used in commercial HVAC applications. Examples of active desiccant wheels and systems are disclosed in several patents e.g. U.S. Pat. Nos. 6,311,511; 5,551,245; and 5,816,065.

"Passive" desiccant wheels do not use an external heat source and rely on the relative humidity difference between two or more airstreams to drive moisture transfer between the air streams. Examples of "passive" desiccant wheel systems and use are disclosed in U.S. Pat. Nos. 6,237,354 and 6,199,388.

As thermally activated desiccant wheel systems use substantial energy (steam, electric, gas etc.) to reactivate or regenerate the wheel, various methods have been adopted in the past to minimize the use of reactivation energy with various control methods and/or use of additional components. Methods such as using heat recovery devices to transfer heat energy from process air to reactivation inlet air, or to transfer heat energy from the outlet of reactivation air to the inlet of reactivation air, have resulted in excessive add-on costs.

Dehumidification is a process of removing moisture from air. There are several known methods of dehumidifying air. The two commonly used involve refrigeration, desiccants, or both. In the case of dehumidification using refrigeration, moisture from an airstream passed over a cooling coil condenses, thereby reducing the moisture in the air stream. In the case of dehumidification using desiccants, the process is one of absorption or adsorption. For absorption, either liquid or solid desiccants are used, typically halide salts or solutions. For adsorption, solid desiccants like silica gel, activated alumna, molecular sieve, etc. are used.

Desiccant based dehumidifier systems can be either the multiple tower, cyclic type, or the continuously rotating type. The air to be dried is generally referred to as process air and the air used to regenerate the desiccant is referred to as regeneration or reactivation air. The terms regeneration and reactivation will be used interchangeably in this specification.

In practice, refrigeration based dehumidification systems are limited in the moisture they can remove, because attempting to reach a dew point humidity below freezing often leads to frost buildup on the cooling coil. Avoiding this, or coping with it, leads to making the system more complex and often necessitates reheating.

Desiccant dehumidifier systems, on the other hand, work independently of the dew point, and hence can achieve very low dew point humidities, necessary for many industrial applications. Some examples of their use are in pharmaceutical production areas and food processing areas. They are well suited for uses which require relative humidities or dew point humidities lower than those that can be technically and economically achieved through refrigeration alone.

Further, hybrid systems using both refrigeration and desiccant units are commonly used and help reduce energy usage and provide simple and reliable operation of the whole dehumidification system.

Compared to refrigeration type dehumidification units, desiccant dehumidifiers usually use more heat energy, mainly for regeneration. Accordingly, many desiccant equipment configurations and control strategies have developed for capacity reasons, and energy control to minimize energy use.

Generally, desiccant dehumidifier units, for air at atmospheric pressure, are of the rotary type. The desiccant is contained in a rotary bed, also referred to as a wheel. The term wheel will be used in this specification, to be understood to be a rotary bed having desiccant. Sometimes the term rotary bed, or just bed alone, may be used. The wheel moves on a continuous or intermittent basis, through, typically, two compartments (often referred to in the industry as sectors), one for process, and the other for regeneration. In the process sector, the process air passes through the wheel and is dried by contact with the desiccant. In the regeneration sector, air is brought in, generally from atmosphere, passed over a heat source to elevate (raise) its temperature, then passed through the remaining portion of the wheel that is referred to as the reactivation or regeneration sector. This heats the wheel and drives out the water. Typically the process sector is 50 to 80% of the total bed/wheel area, though it could be more or less, the remainder being the reactivation sector.

Often, another sector is added between the process and regeneration sector, and is referred to as the purge sector. A third airstream (generally called the purge air) is passed through the purge sector and becomes a portion of the regeneration air. The incorporation of the purge sector helps to recover some residual heat from the rotating wheel before it enters the process sector, thereby reducing the overall energy requirement for regeneration, as well as improving the overall moisture removed by the wheel.

When working in the field of desiccant wheels and driers or systems that use them, it is customary to describe systems in terms of flowcharts or schematics that may lead a layperson to believe the wheel is physically split into separate sectors.

However that is not the case. The desiccant wheel is uniform and without separators. Each square inch on the surface of the wheel is substantially the same as another square inch. So a portion of the wheel referred to as, for example, the regeneration sector (sometimes referred to as a portion, or zone) is actually the area of the wheel that happens to be passing through that air stream sector (sometimes referred to as a portion, or zone) at the moment. Thus, for example a particular point of the wheel may pass through the process sector, a purge sector, and a regeneration sector encountering different air conditions as it does so. Those air conditions may be taking moisture from, or adding moisture to, the desiccant material.

In typical desiccant dehumidifier units, the process air flow rate and the reactivation flow rate are generally fixed and are set or adjusted with the help of manual or automatic dampers. This can be improved upon.

In the design of a typical dehumidifier system for controlling the humidity in a given space, the airflow needed to control the space temperature may often be more than the quantity of dehumidified air needed to control the space humidity. In such cases, a portion of the process air is typically bypassed around the dehumidifier unit, and is then combined with air exiting the dehumidifier unit. Then the combined air is cooled (or heated), and supplied to the controlled space.

As desiccant dehumidifier systems inherently use a significant amount of heat energy for regeneration, efforts have been made to find ways to reduce the amount of heat used by the system.

One well-known system and method used is to control the heated temperature of the regeneration air before it enters the reactivation sector of the wheel.

Another well-known method is to control the regeneration heat input amount by controlling the air temperature leaving the reactivation sector.

Depending upon the type and amount of relative humidity and dew point control, when the space or air condition is satisfied, the control strategy may employ the start/stop of the dehumidifier. Similarly, use may be made of automatic dampers to continuously vary the amount of air bypassing the dehumidifier unit to satisfy the operation and design needs.

The correlation of the process and reactivation sector area, the wheel rotating speed, the relative process and reactivation air flow rates and velocities through the two sectors, have in the recent decade been documented in Japan, India and USA resulting in robust mathematical modeling tools regularly used for the design, selection, and incorporation of a desiccant wheel, in a finite way, in a dehumidifier unit. Such tools are being used regularly to optimize a dehumidifying system at the design and build stage.

One such study and development of a mathematical model is detailed in a document "Modeling of Rotary Desiccant Wheels" by Harshe, Utikar, Ranade and Pahwa, in 2005.

In the case of rotating desiccant dehumidifier units, it has been known that equipment performance at the design and build stage can be optimized by using such a mathematical modeling tool, to select a particular percentage as reactivation sector, as well as the process and reactivation flow rates, and also a given bed rotational speed. In such cases, under part loads and instantaneously changing moisture load, dehumidifier capacity control is achieved by using the traditional control strategies described above, some of which are well known and well documented, for example in the Bry Air design manual as well as the Munters design manual. However, with these traditional and known methods of dehumidifier capacity control, during the operation of such dehumidifier systems, reduction of the regeneration energy usage is limited. All of the above do not achieve the maximum energy reduction desirable, or to a large extent commensurate, with the changes in the instantaneous moisture load.

There are several examples of prior art practiced to reduce the regeneration energy and/or to regulate the desiccant wheel speed while optimizing dehumidifier capacity.

U.S. Pat. No. 4,546,442 teaches a microcomputer-based programmable control system for fixed bed, multi-bed desiccant air dryers commonly used to dehumidify compressed air or other compressed gases. The control system is used to monitor the level of moisture in the desiccant and determine whether a regeneration cycle is required, and also to monitor the full depressurization and repressurization of the regeneration bed, and also to analyze and indicate valve malfunction. The application of the invention is limited to a compressed air system.

U.S. Pat. No. 4,729,774 teaches the profiling of air temperature in the regeneration sector to improve dehumidifier performance.

U.S. Pat. No. 4,926,618 teaches a desiccant unit having controllable reactivation air recirculating means and variable wheel speed means. The process air humidity is controlled by a master controller modulating wheel speed, reactivation air recirculation rate and reactivation heat input. Process and reactivation airflow rates through the wheel are fixed, and the reactivation air heater is controlled to maintain a constant reactivation air temperature leaving the wheel.

U.S. Pat. No. 5,148,374 teaches a system and method for real-time computer control of multi wheel sorbent mass energy transfer systems by optimization of calculated mass transfer ratios and measures of system effectiveness which are not subject to long system time constants. The method relies on sensing at predetermined intervals a predetermined set of parameters selected from the group of wheel inlet temperature, and wheel outlet temperature, etc., to send a control signal to a predetermined one of a group of control means which includes controlling fluid flow temperature. The objective of the control method is to improve the response of the controlled device to a rapid change in load without causing unstable operation of the device and resultant fluctuations of the controlled variable.

U.S. Pat. No. 5,688,305 teaches an apparatus and method of regeneration of regeneration control for a desiccant dehumidification system in which the reactivation airflow is controlled to maintain a constant reactivation discharge air temperature and the reactivation air inlet temperature is controlled at a fixed value. The residence time of the desiccant in reactivation is also controlled in inverse proportion to the reactivation airflow. The object of this document is to reduce the over-generation of desiccant under part-load conditions, thus improving the operating efficiency of the desiccant dehumidifier. The application cited is for drying granular material in a bin or hopper using a dehumidified recirculated airstream, when the flow of granular material through the bin may occur in batches or at a variable rate.

U.S. Pat. No. 6,199,388 B1 teaches a system and method for controlling the temperature and humidity level of a controlled space and is applied mainly to a combination of an enthalpy wheel, otherwise known as energy recovery wheel, a cooling coil, and a "passive" desiccant dehumidification wheel which does not employ any external thermal heat or energy input for reactivation. It further teaches a means for changing the performance of a "passive" desiccant wheel through change in rotational speed in response to the sensible and latent loads in the controlled space. Control of the desiccant wheel speed is discussed and the intent is to control the dehumidification capacity of the "passive" wheel rather than optimize the energy efficiency of the dehumidification process. It does not teach the use of process air face and bypass dampers to control the capacity of the dehumidification wheel. Both supply (process) and exhaust (reactivation) airflows are maintained at a constant value through all loading conditions.

U.S. Pat. No. 6,355,091 B1 teaches a unitary ventilation and dehumidification system for supplying outside ventilation air to a conditioned space. The unit includes a desiccant wheel which is rotated at a slow speed to accomplish more dehumidification, and at a fast speed to accomplish more heat recovery. Heat may be added to the space exhaust air upstream of the desiccant wheel to improve its dehumidification performance and to prevent frost formation during winter operation. Both supply and exhaust airflows are fixed, no bypass dampers are used, and rotor speed adjustment is for selection of operating mode and not efficiency improvement.

U.S. Pat. No. 6,767,390 B2 teaches a method to control the performance of a multi-bed, fixed bed desiccant dryer for compressed air and compressed gas applications and to optimize the regeneration and purge cycles to deliver the gas at the desired dew point. The intended field of application is compressed air for use in instruments.

U.S. Pat. No. 7,017,356 B2 teaches about an HVAC system for cooling and dehumidifying comfort-conditioned spaces which includes a desiccant wheel in a passive dehumidification arrangement where the wheel's speed varies with airflow, and the wheel is operated for at least a set period during start up to prevent a surge of humid air into the conditioned space. This patent also teaches the use of a passive sensible recovery device and cooling coil to precondition the outside air before it mixes with the return air from the conditioned space.

U.S. Pat. No. 7,101,414B teaches a method for reducing a sorbent concentration for a process fluid stream using a sorption bed system which includes material that is rotated through multiple zones, in addition to traditional process and regeneration zones, whereby one or two pairs of independent recirculated fluid streams, other than process and regeneration flow streams, are used to isolate process and regeneration flow streams from each other. The objective of the isolation may be to prevent cross-leakage of air between process and reactivation zones, permeation of sorbate through the sorption bed, or formation of condensation or frost on the sorption bed.

U.S. Pat. No. 7,338,548 B2 teaches the use of an apparatus and a control method of conditioning humidity and temperature in a process air stream from a desiccant dehumidifier, where a portion of the process discharge air is used to preheat the regeneration air by use of an air-to-air heat exchanger. The field of use of the invention is in drying of structures and remediation of water damage.

U.S. Pat. No. 7,389,646 B2 is a divisional application for previous work and is similar to 7,017,356 B2 by the same inventor. It also is intended for cooling and dehumidifying comfort-conditioned spaces and teaches an HVAC system which includes a passive desiccant wheel, wherein the wheel's speed varies with airflow, and relies on the wheel being energized for at least a set period, at start up, and employs a heat recovery system upstream of the wheel to enhance the system's ability to dehumidify air.

Prior art control strategies have been only partially successful in limiting and reducing the use of reactivation energy. Further, during the use and application of the desiccant wheel and system, there is usually a considerable change in the instantaneous moisture loads in the fresh air and the internal latent loads within the controlled space, based on the changes of outdoor temperature and humidity, and product and occupancy loads. Therefore a need exists for a control method, along with necessary related components, that will substantially reduce the use of reactivation energy and that responds not only to changes in the dynamic/instantaneous moisture load but also simultaneously allows the optimization of energy use in the wheel, during these changes in moisture load.

To better understand the invention, first, FIGS. 1-7 are used to further provide background.

FIG. 1(a) is a typical desiccant dehumidifier flow chart, illustrating that, a typical rotating desiccant bed/wheel 1 has a process sector 2 and regeneration or reactivation sector 3. The dehumidifier incorporating such a wheel 1 would have a process flow 6, and regeneration flow 8. The regeneration flow 8 is elevated in temperature by a heat source 10 before entering the reactivation sector 3. The regeneration air, exiting the reactivation sector 3 is exhausted at 9 by regeneration blower 5. Rotation of wheel 1 is driven by a bed drive arrangement 4 that may include a drive belt 4A. In this application the term "rotational driver" or similar has the same meaning as a bed drive arrangement. There are a variety of arrangements of rotating means possible.

FIG. 1(b) illustrates a typical sector division of the wheel 1. The process sector 2, in a typical unit is 75% of the total bed area, as is shown, and can, in practice, generally vary from 50% to 80%, but can be designed to be smaller or larger. The remaining area of the wheel 1 is reactivation sector 3, and can vary between 20% and 50% but can be designed to be even smaller or larger.

FIG. 2(a) illustrates purge sector 11. The purge sector generally varies from 5 to 40% of the total bed area, the remainder being divided between process sector 2 and reactivation sector 3. When the bed rotates from the reactivation sector 3 to the process sector 2, the bed is still hot. It is well known that the hot portion of the bed, particularly if it is of the silica gel type, will begin to perform (that is, remove moisture) when it has cooled down. Therefore, a certain portion of the bed is substantially inactive in performing the dehumidifying function while it is still hot. This segment or portion of the bed is often sectioned off and made into a purge sector 11. Air 12 is made to pass over this sector 11, where the bed is hot, whereby the air 13 is preheated, before being made to pass through the reactivation sector 3, thereby both reducing the reactivation energy input needed, and also cooling that portion of the bed before entering the process sector 2, whereby the dehumidification performance through the process sector 2 is improved. In addition, less heat is imparted to the process air because the bed is cooler when it enters the process sector.

FIG. 2(b): shows the desiccant bed/wheel 1 from another angle, where various sectors are marked. Although shown in typical proportions, these areas can vary, as explained above.

FIG. 3(a): shows a flow chart of a rotary wheel 1 system embodiment where a pair of sectors (11a,12) has been added. In such a configuration it is typical to continuously circulate a given amount of airflow through these sectors, in a closed loop, with the help of a separate fan 15. The recirculated airflow acts as a buffer between the process and reactivation airstreams, capturing air leakage or moisture diffusion between the process and reactivation airstreams and thus improving the system performance. In some cases the recirculated airflow may also transfer heat between the sectors in the same manner as the purge sector shown in FIG. 2, further improving the system performance. It should be noted that the airflow in the recirculation loops described in all the figures may be in either direction, with the most advantageous direction depending on the specifics of a particular application.

FIG. 3(b): shows the wheel 1 from another angle, with various sectors marked. Although shown in typical proportions, these sectors areas can vary, as clearly explained above.

FIG. 4(a) is a flow chart of a rotary desiccant bed/wheel 1 where more than one pair of purge sectors 11a, 12, 17,18 has been added. In such a configuration, it is typical to circulate a given amount of air 13, 19 through these sections, in a closed loop, by separate fans 15, 21.

FIG. 4(b) shows the wheel 1 from another angle, with various sectors marked, and also shown in a typical way, these sectors can vary, as clearly explained above.

FIG. 5(a &b) shows a typical and traditional dehumidifier system for controlling a space 27. In this system, for example, the cooling needs for the space to be dehumidified, necessitate a certain quantity of overall supply air 26 to be taken over the cooling unit or coil 24, and then supplied to the controlled space. A greater airflow may be required to satisfy the space cooling needs than needs be passed through the desiccant wheel to satisfy the space dehumidification needs. To accomplish this it is common practice to take a portion of the air through the dehumidifier and bypass 25 to make up the total supply airflow passed through the cooling coil and delivered to the space 27. There is often a need to supply fresh air 31 to meet space ventilation/pressurization requirements. The fresh air is generally introduced at the inlet to the dehumidifier, combined with the returning air 28 from the controlled space 27. It may be advantageous to cool/heat the fresh air before combining it with the return air using air heating/cooling means 22 and 23 as shown in the figure. In this typical flow chart/schematic, the fresh air flow is controlled with a damper 35. A bypass damper 32 is used to control the flow that needs to bypass the desiccant dehumidifier unit. The overall supply air flow 26 is controlled with damper 33. Each of these dampers may be adjusted manually, or automatically using actuators and appropriate controls.

Regeneration flow is controlled with a damper 34 generally positioned after the reactivation fan 5. The regeneration heat input source 10 may be electric, steam, gas or oil burner, thermal fluid such as hot water, refrigeration condenser heat, recovered heat from another process, or any combination of these that can heat the reactivation air to the temperature required for the application. The reactivation heat energy input is regulated by a thermostat 30 which is generally positioned prior (FIG. 5(a)) to the desiccant bed 1. Alternatively, thermostat 36 may be located after the desiccant bed in the reactivation "out" section as shown in FIG. 5b. In some cases the control location of FIG. 5B results in reduced annual reactivation heat use, compared with the thermostatic location of FIG. 5A.

In both the above mentioned dehumidifier systems and reactivation heat input regulation and control methods, control strategies presently used will sense the "satisfaction" of the relative humidity or moisture level of a given space, or process, or supply air, and stop the reactivation airflow, bed rotation and reactivation heat input when the humidity is satisfied, commonly referred to as "on-off" control. In another known method, commonly used with fixed temperature heat sources such as steam or hot water, the reactivation airflow is modulated to regulate the dehumidification capacity of the unit.

FIG. 6(a): shows a typical dehumidifier system used for drying applications. In this system, the dehumidified air 7 is heated by a heat source 22 as per the requirement of the material in a drying bin 37. The return air 28 carrying moisture from the product is passed over cooling coil 23 and passed through the desiccant wheel/bed 1 to adsorb the moisture.

The regeneration airflow 8 is provided by the reactivation blower 5. The heat source 10 is used to elevate the temperature based on the specific design of the unit. The reactivation inlet temperature is controlled through thermostat 30.

FIG. 6(b) shows the desiccant bed/wheel from another angle. The process sector 2, in a typical unit is 75% of the total bed area, and is shown as such, and can, in practice, generally vary from 50% to 80% but can be designed to be even smaller or larger. The remaining area of desiccant bed is shown as the reactivation sector 3, and can vary between 20% and 50% but can be designed to be even smaller or larger.

FIG. 7(a) Shows a second typical dehumidifier system for a drying application.

This is similar to the system explained in FIG. 6 (a&b), except a purge sector 11 has been added. This purge sector can vary from 5 to 40% of the total bed area. The object of using a purge sector has already been explained previously.

FIG. 7(b) shows desiccant bed/wheel 1 from another angle, where the various sectors are marked, and although shown in a typical way these sectors areas can vary, as explained above.

SUMMARY OF THE INVENTION

The general object and purpose of the invention is to substantially reduce the cumulative energy used in the ongoing operation of a thermally activated desiccant dehumidification system. The energy reduction is generally achieved by modulating the energy consumed by the desiccant unit in response to the instantaneous changes in moisture in the ambient air and/or the moisture load in the controlled space, and/or the moisture change of the process flow. Such instantaneous changes of moisture, and resultant moisture load, require the need to control the capacity of the dehumidification system.

With constantly varying and changing instantaneous moisture load, this dehumidification capacity control is mainly achieved by controlling the air flow through the process sector of the wheel; optimum/minimum energy use in the dehumidifier is achieved by proportionately controlling the air flow through the reactivation sector, and keeping constant the reactivation air temperature, while simultaneously and proportionately adjusting the rotation speed of the wheel, so that optimum energy efficiency is achieved.

While there are established methods for control of the capacity of the dehumidifier system, the present invention provides a novel method, achieving a substantial reduction in energy usage at part-load compared to the previous known methods.

The objects of the invention are achieved by a system and method to control dehumidification capacity comprising:
(a) controlling the airflow through the process sector of the rotor, and controlling a constant reactivation inlet temperature, and controlling the reactivation airflow as a function of the process airflow, and also controlling the rotor speed as a function of the process airflow, and the control functions are based on the ratio of instantaneous process airflow to design process airflow and the functions are all exponential functions with the exponents lying anywhere in the range of 0.5 to 2.0, and with the exponents for each controlled variable not necessarily being equal.
(b) controlling the airflow through the process sector of the rotor, and controlling a constant reactivation heat source temperature, for example, by use of steam at constant pressure as the reactivation heat source and use of a two position steam valve on the reactivation air heating coil, and by controlling the reactivation airflow as a function of the process airflow, and also controlling the rotor speed as a function of the process airflow, and the control functions are based on the ratio of instantaneous process airflow to design process airflow and the functions are all exponential functions with the exponent lying anywhere in the range of 0.5 to 2.0, and with the exponents for each controlled variable not necessarily being equal.

(c) controlling the airflow through the reactivation sector of the rotor while maintaining a constant airflow through the process sector and controlling a constant reactivation inlet temperature, and also controlling the rotor speed as a function of the reactivation airflow, and the control function is based on the ratio of instantaneous reactivation airflow to design process airflow and the function is an exponential function with the exponent lying anywhere in the range of 0.5 to 2.0.

(d) controlling the airflow through the reactivation sector of the rotor while maintaining a constant airflow through the process sector and controlling a constant reactivation heat source temperature, for example, by use of steam at constant pressure as the reactivation heat source and use of a two position steam valve on the reactivation air heating coil, and also controlling the rotor speed as a function of the reactivation airflow, and the control function is based on the ratio of instantaneous reactivation airflow to design process airflow and the function is an exponential function with the exponent lying anywhere in the range of 0.5 to 2.0.

(e) controlling the airflow through the process sector of the rotor, and controlling a constant reactivation discharge temperature, and controlling the reactivation airflow as a function of the process airflow, and also controlling the rotor speed as a function of the process airflow, and the control functions are based on the ratio of instantaneous process airflow to design process airflow and the functions are all exponential functions with the exponents lying anywhere in the range of 0.5 to 2.0, and with the exponents for each controlled variable not necessarily being equal.

(f) controlling the airflow through the reactivation sector of the rotor while maintaining a constant airflow through the process sector and controlling a constant reactivation discharge temperature, and also controlling the rotor speed as a function of the reactivation airflow, and the control function is based on the ratio of instantaneous reactivation airflow to design process airflow and the function is an exponential function with the exponent lying anywhere in the range of 0.5 to 2.0.

Another object of the invention is to provide a system and method of controlling dehumidification capacity in accordance with the four control scenarios described above, and in addition incorporate a purge sector, disposed sequentially between the reactivation and process sector of the rotors with concurrent airflow through the process sector and purge sector, and control the purge airflow as a function of the reactivation airflow, the control function being based on the ratio of the instantaneous reactivation airflow and design reactivation airflow and being an exponential function with the exponent lying anywhere in the range of 0.5 to 2.0.

Another object of the invention is to provide a system and method to control dehumidification capacity in accordance with the four control scenarios described above, and in addition incorporate at lease one pair of purge sectors disposed between the process and reactivation sectors and each pair of sectors having means to re-circulate air through them, in accordance with U.S. Pat. No. 7,101,414 B2, the improvement being to control the re-circulation rate of the purge air as a function of the rotor speed, and the function being based on the ratio of instantaneous rotor speed to design rotor speed and the function being an exponential function with the exponent lying anywhere in the range of 0.5 to 2.0.

In the above embodiments there is a further object which is to provide a design feature for the basic cabinet and plenums to permit the reactivation sector size to be easily adjusted at the time of fabrication or after installation in the field to further optimize the design for any given application for the dehumidification system. The optimization is achieved by selecting the relative size of the process and reactivation sectors that permits the lowest reactivation energy use at design conditions and/or the lowest process discharge humidity.

One or more of the above objects of the invention are to provide a thermally activated dehumidification system employing an "active" desiccant rotor so that full advantage is taken of the dynamic behavior of the desiccant rotor under varying part load or process flow conditions.

Accordingly the present invention provides an apparatus for dehumidifying air supplied to an enclosed space or process or drying bin, the apparatus comprising:

(a) a housing defining an interior space;

(b) the interior space being separated by a separator into a supply portion for containing a supply air stream and a regeneration portion for containing a regeneration air stream, the supply portion being provided with an inlet for receiving supply air and an outlet for supplying air to the enclosed space, the regeneration portion being provided with an inlet for receiving regeneration air and an outlet for discharging regeneration air;

(c) a rotatable desiccant wheel positioned such that a portion of the wheel extends into the supply portion and a portion of the wheel extends into the regeneration portion, the wheel being rotatable through the supply air stream and the regeneration air stream to dehumidify the supply air stream;

(d) a heat source to heat the regeneration air stream in order to regenerate the desiccant wheel as it rotates through the regeneration air stream; and (e) at least one bypass damper between the inlet and the outlet of the supply portion for controlling the amount of supply air passing through the desiccant wheel by selectively bypassing the desiccant wheel.

In one embodiment, the apparatus can be a conventional HVAC unit or a hybrid air conditioning and dehumidifying apparatus.

In another embodiment, the regeneration portion is provided with a fan to move the regeneration air stream.

In another embodiment, a duct and control means is provided to permit the recirculation of a portion of the regeneration air.

In a preferred embodiment, a damper and/or speed control means is provided to permit modulation of the airflow through the regeneration portion.

In another embodiment, the supply portion is provided with a fan to move the supply air stream; a cooling coil is positioned in the supply air stream; with the rotatable desiccant wheel being positioned downstream of the cooling coil.

In another embodiment, a speed regulation mechanism is provided to vary the rotational speed of the desiccant wheel to control the amount of moisture removed from the supply air stream and/or minimize the amount of heat transferred to the supply air stream.

In a further embodiment, the heat source is a direct-fired gas burner.

In a further embodiment, the heat source is electricity used in resistance heaters.

In a further embodiment, the heat source is a constant-temperature source such as steam or hot water.

In a further embodiment, the heat source is a source of recovered heat from a refrigeration condenser or recovered heat from another process.

In a further embodiment, the heat source is a combination of two or more of the heat sources described above, used sequentially.

In a preferred embodiment, a heat modulating means is provided for the heat source to regulate the temperature of the regeneration air stream.

In another embodiment of the invention, a modulation means is provided for the bypass damper to regulate the amount of supply air passing through the desiccant wheel.

In another embodiment, the desiccant wheel is sized to handle a desired fraction of the air flow processed by the air conditioning system.

In another embodiment, means are provided to cool and/or heat the supply air after it passes through the dehumidifier and before it is delivered to the conditioned space.

In another embodiment, the system includes a compartment housing a condenser, the apparatus being provided with a duct or opening connecting regeneration inlet air to the condenser housing compartment in order to enable pre-heating of regeneration inlet air by the condenser.

The invention also provides a method for controlling the temperature and humidity of a conditioned space or process or drying bin, the method comprising the steps of:
(a) providing an air conditioning system in communication with the conditioned space;
(b) providing an active desiccant wheel system defining an interior space; the interior space being separated by a separator into a supply portion for containing a supply air stream and a regeneration portion for containing a regeneration air stream, the supply portion being provided with an inlet for receiving supply air from the enclosed space or the air conditioning system and an outlet for supplying air to the air conditioning system or the enclosed space, the regeneration portion being provided with an inlet for receiving regeneration air and an outlet for discharging regeneration air; a rotatable desiccant wheel positioned such that a portion of the wheel extends into the supply portion and a portion of the wheel extends into the regeneration portion, the wheel being rotatable through the supply air stream and the regeneration air stream to dehumidify the supply air stream; a heat source to heat the regeneration air stream in order to regenerate the desiccant wheel as it rotates through the regeneration air stream; and at least one bypass damper between the inlet and the outlet of the supply portion for controlling the amount of supply air passing through the desiccant wheel by selectively bypassing the desiccant wheel;
(c) connecting the active desiccant wheel system to the air conditioning system;
(d) cooling and/or heating the supply air stream by passing it through the air conditioning system; and
(e) dehumidifying the supply airstream by passing it through the active desiccant wheel system while rotating the wheel through the supply air stream and the regeneration air stream to exchange moisture and/or heat between the air streams; and
(f) delivering air from the air conditioning system to the conditioned space.

BRIEF DESCRIPTION OF THE DRAWINGS

These and other embodiments and advantages of the present invention will become more fully apparent from the following description and accompanying drawings where.

DETAILED DESCRIPTION OF THE INVENTION

The present invention will now be described with reference to accompanying drawings which are illustrative of certain embodiments of the invention. Variations and modifications are possible without departing from the spirit and scope of the invention.

Figure 1A:
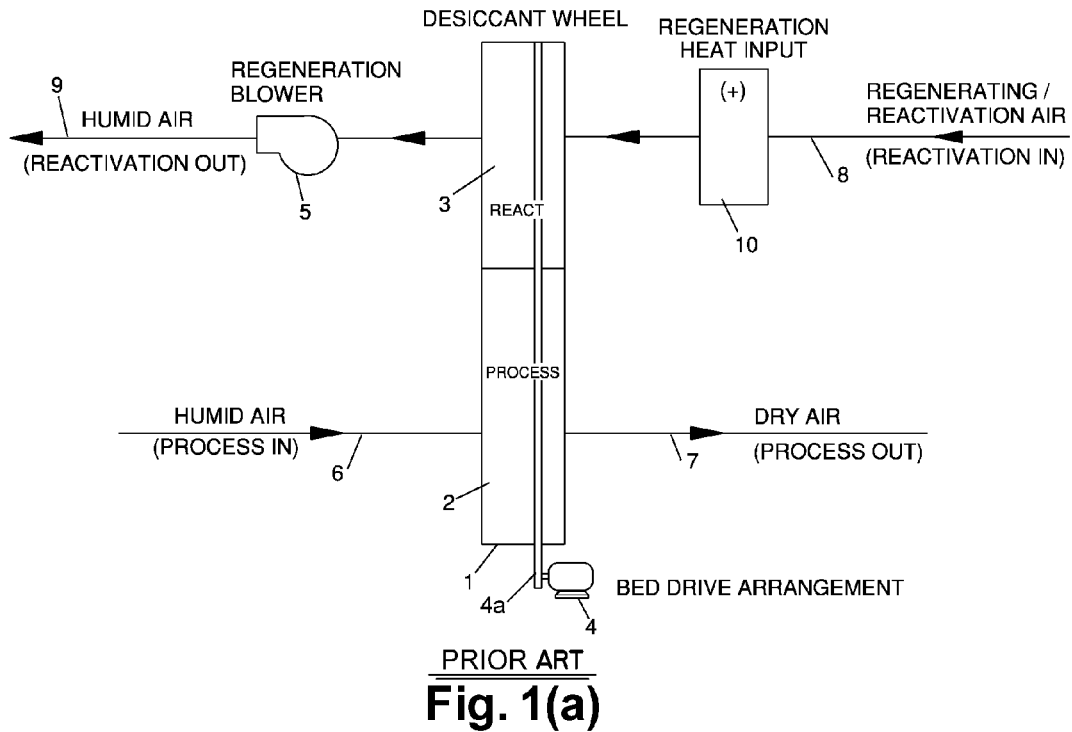
FIG. 1(a&b): is a schematic drawing of a typical thermally activated desiccant dehumidifier unit shown along with the regeneration blower and shows a typical/classic 25% regeneration sector.
Figure 1B:
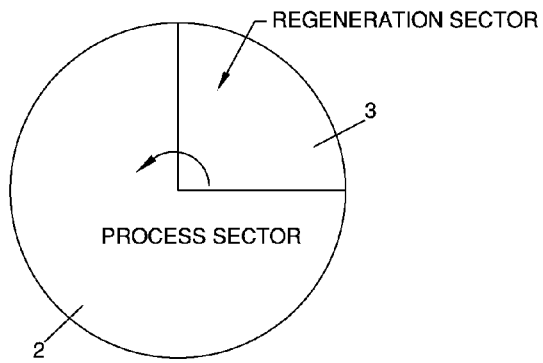
Figure 2A:
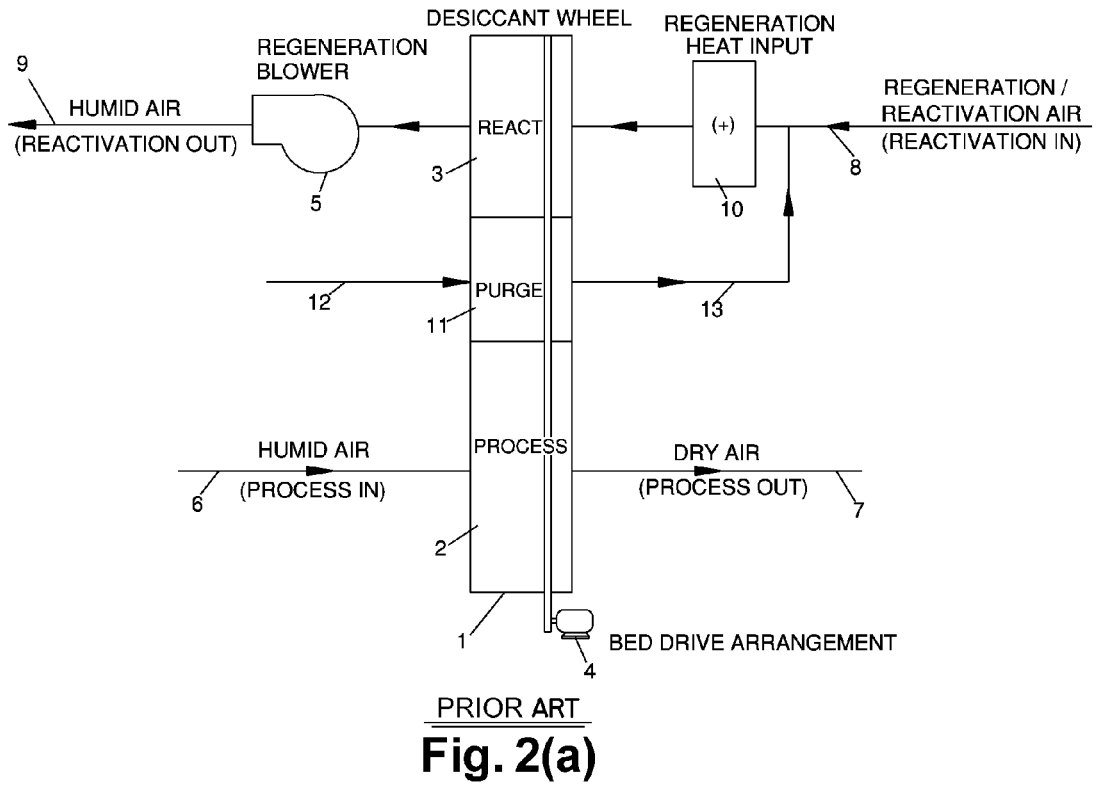
FIG. 2(a&b): is a schematic drawing of a typical thermally activated desiccant dehumidifier unit shown along with the regeneration blower and shows a typical/classic 25% regeneration sector, and also includes a purge sector.
Figure 2B:
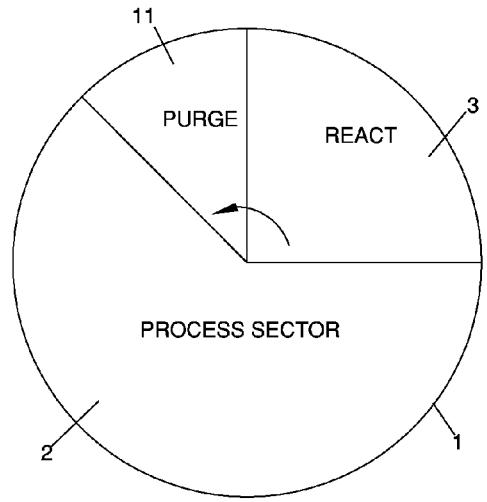
Figure 3A:
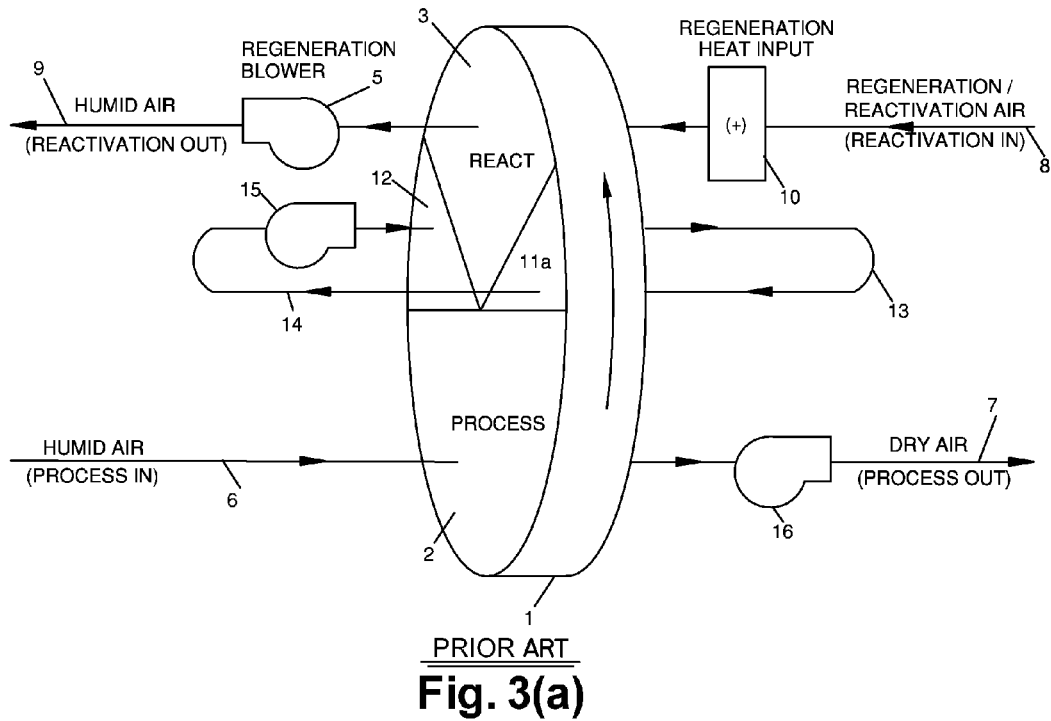
FIG. 3(a&b): is a schematic drawing of a typical thermally activated desiccant dehumidifier unit shown along with the regeneration blower and shows a typical/classic 25% regeneration sector, and also includes a pair of a purge sectors.
Figure 3B:
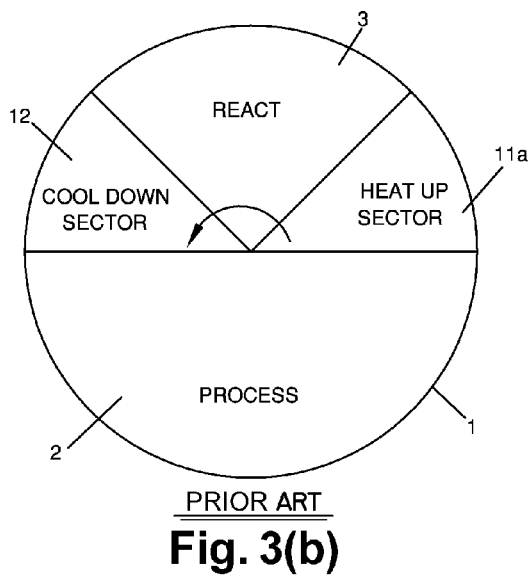
Figure 4A:
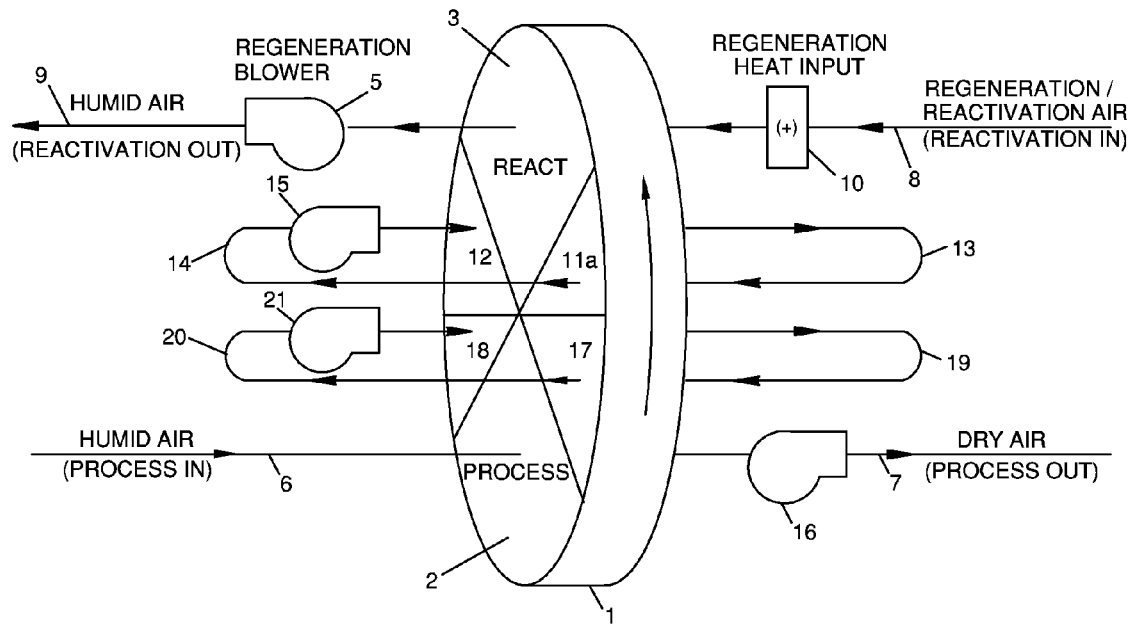
FIG. 4(a&b): is a schematic drawing of a typical thermally activated desiccant dehumidifier units shown along with the regeneration blower and shows a typical/classic 25% regeneration sector and also includes additional two pairs of purge sectors.
Figure 4B:
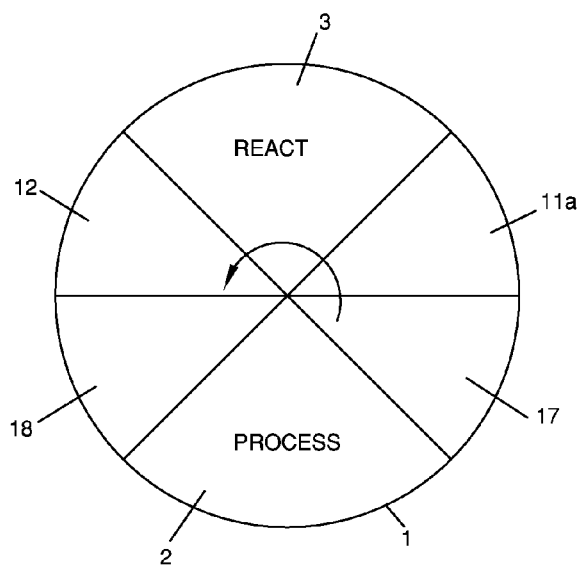
Figure 5A:
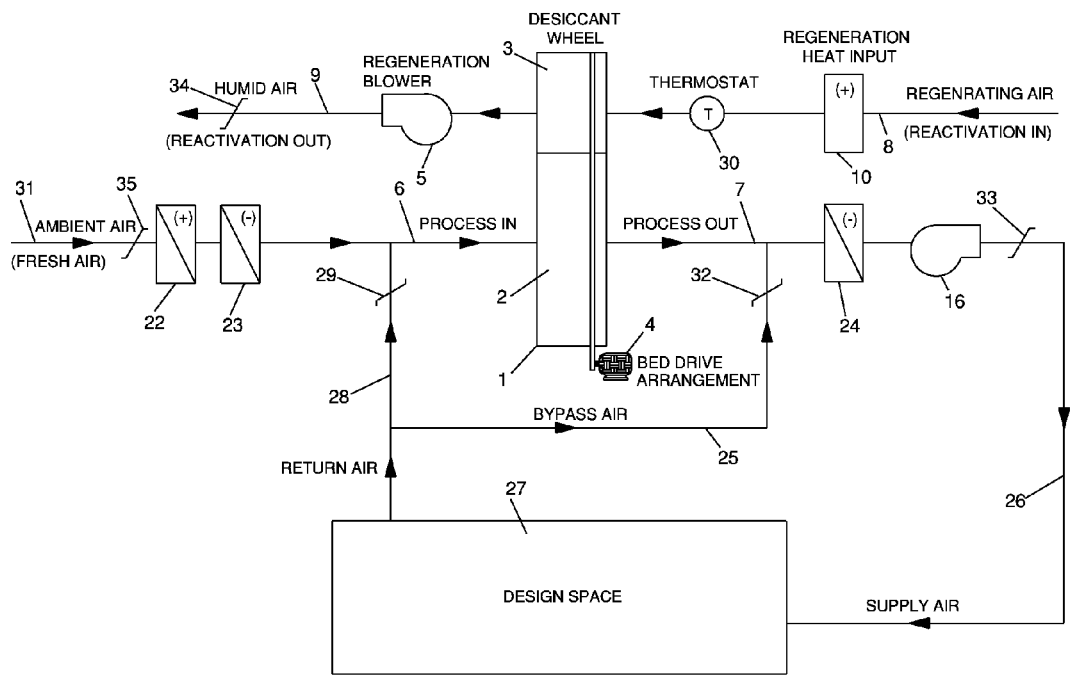
FIG. 5(a& b): is a schematic diagram showing a typical prior art dehumidification system and method.
Figure 5B:
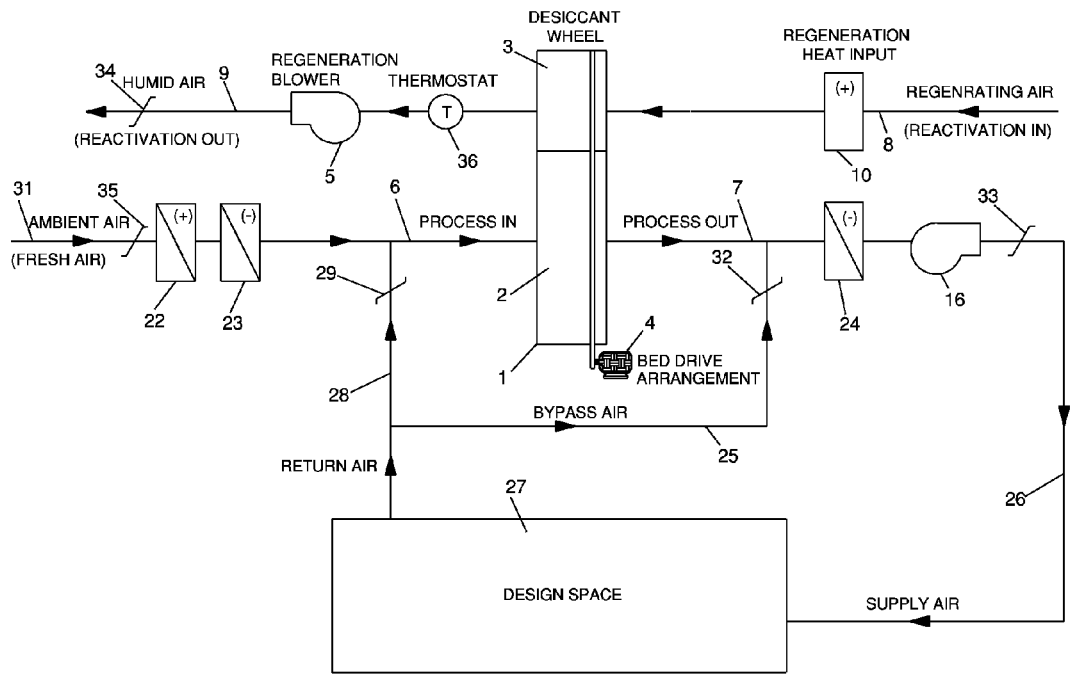
Figure 6A:
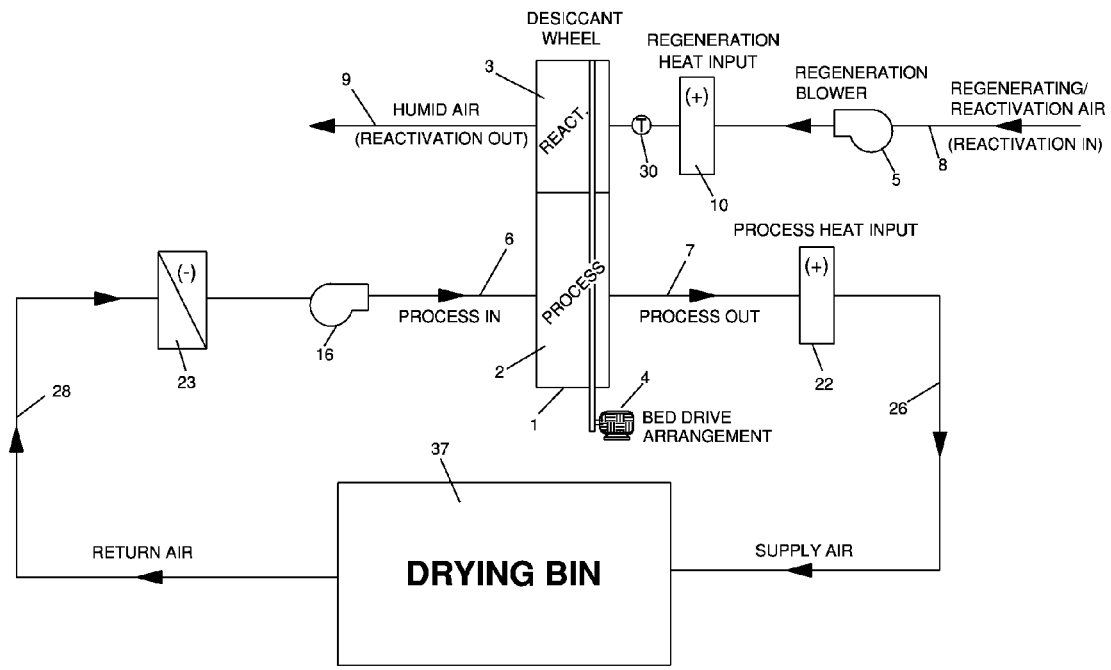
FIG. 6(a&b): is also a schematic showing a typical prior art product drying system and method.
Figure 6B:
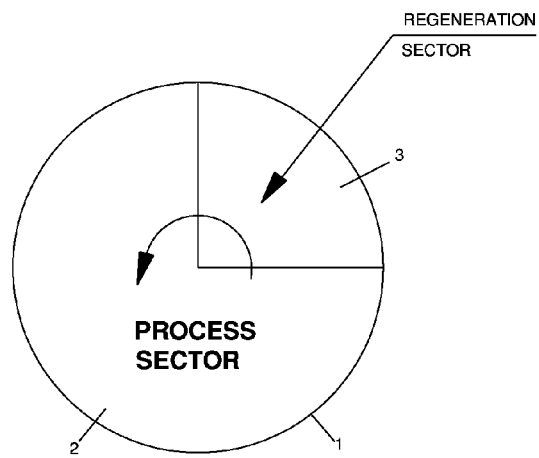
Figure 7A:
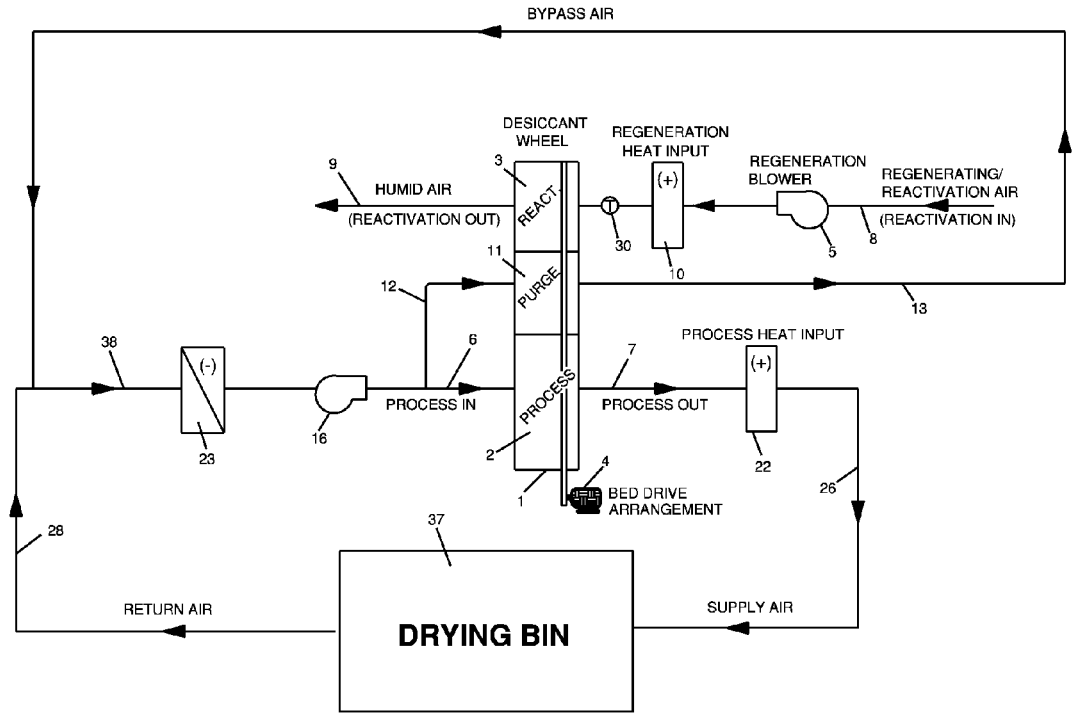
FIG. 7(a&b): is also a schematic showing a typical prior art product drying system and method and also includes a purge sector.
Figure 7B:
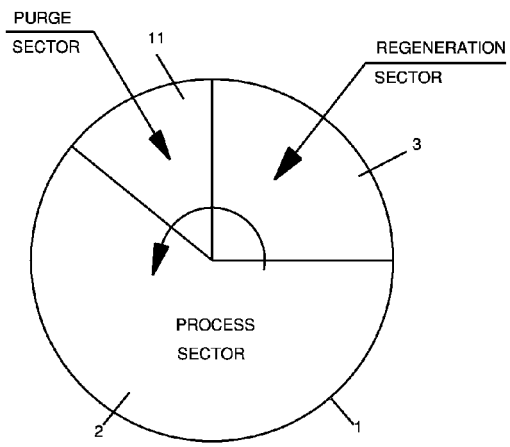
Figure 8:
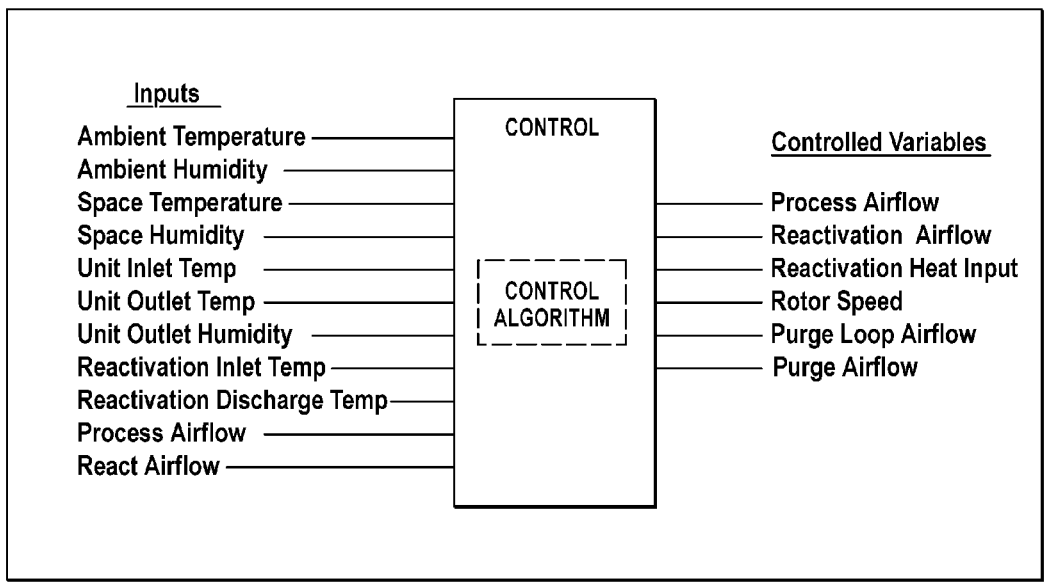
FIG. 8 is a schematic illustrating inputs and variables controlled by a control algorithm.
Figure 9A:
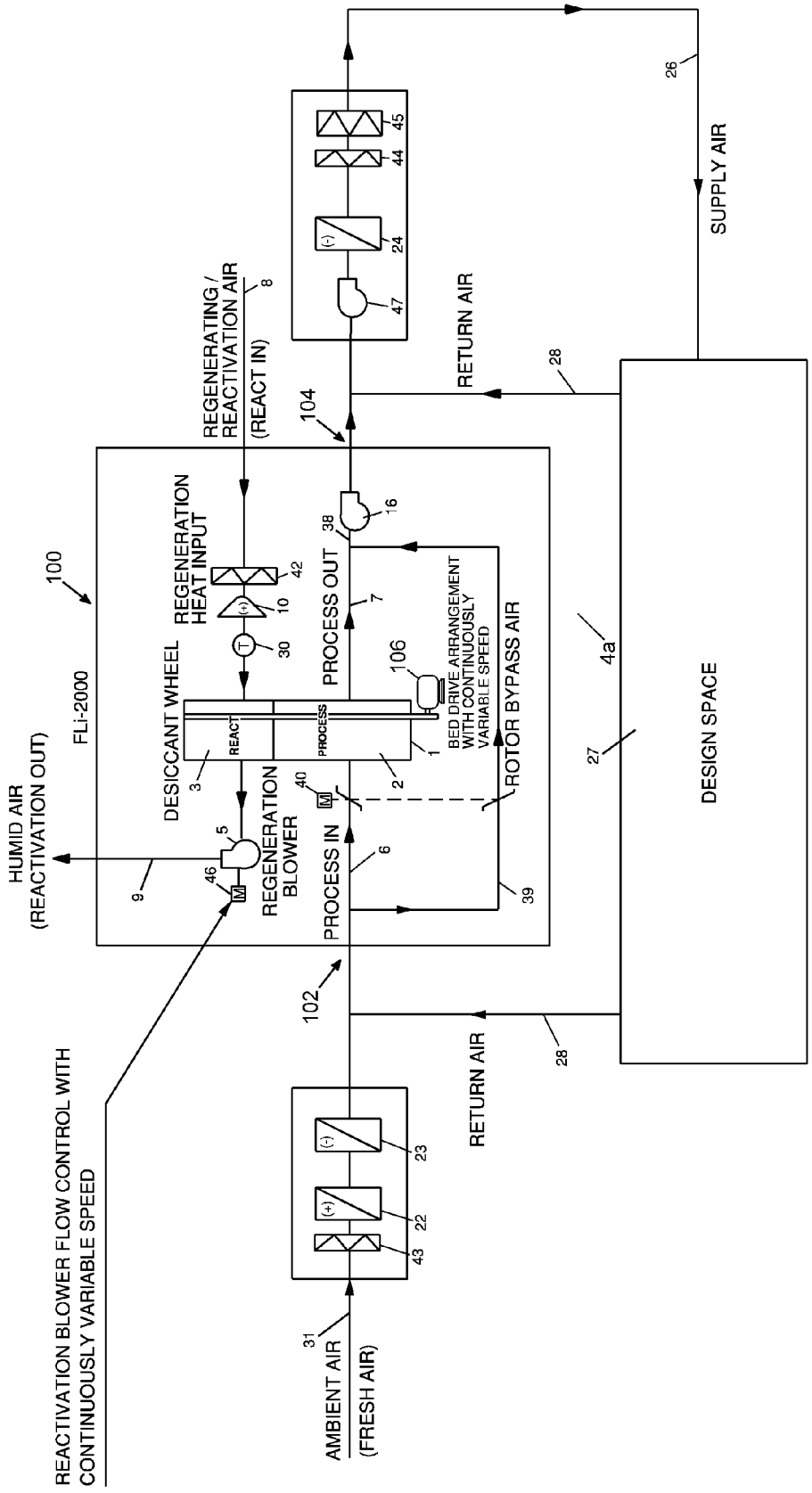
FIG. 9(a, b, c, d&e): are schematics showing an embodiment of the system and method of the present invention.
Figure 9B:
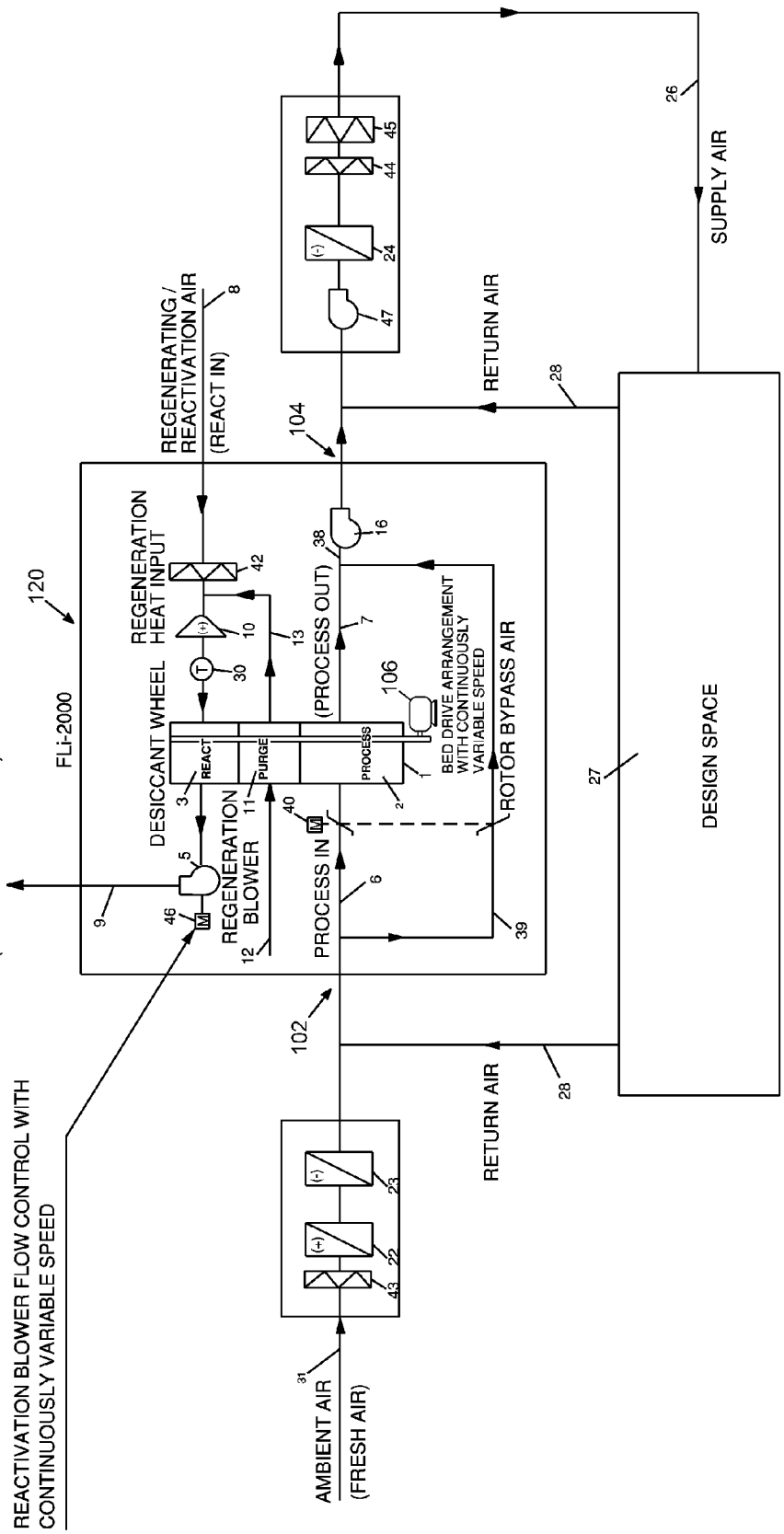
Figure 9C:
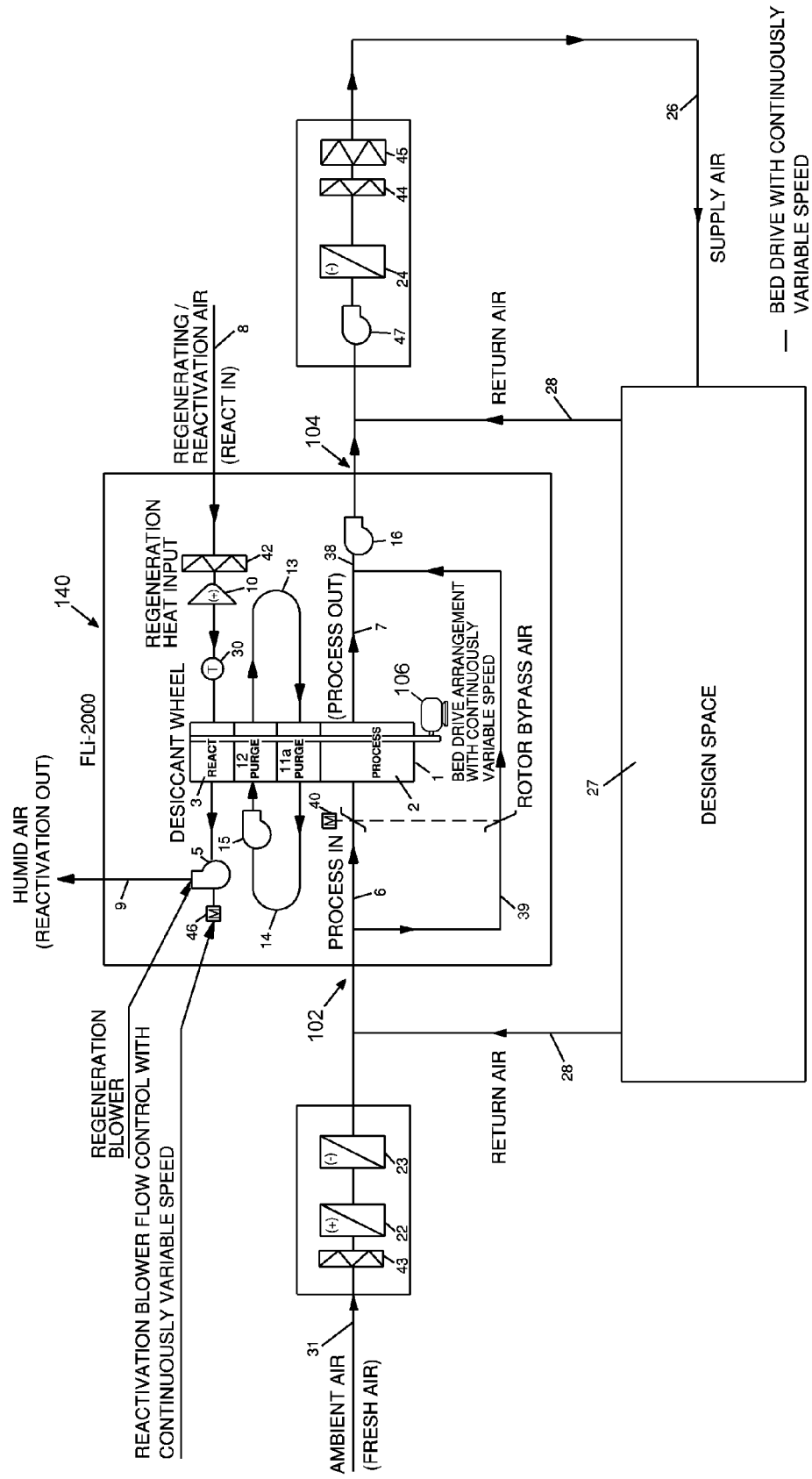
Figure 9D:
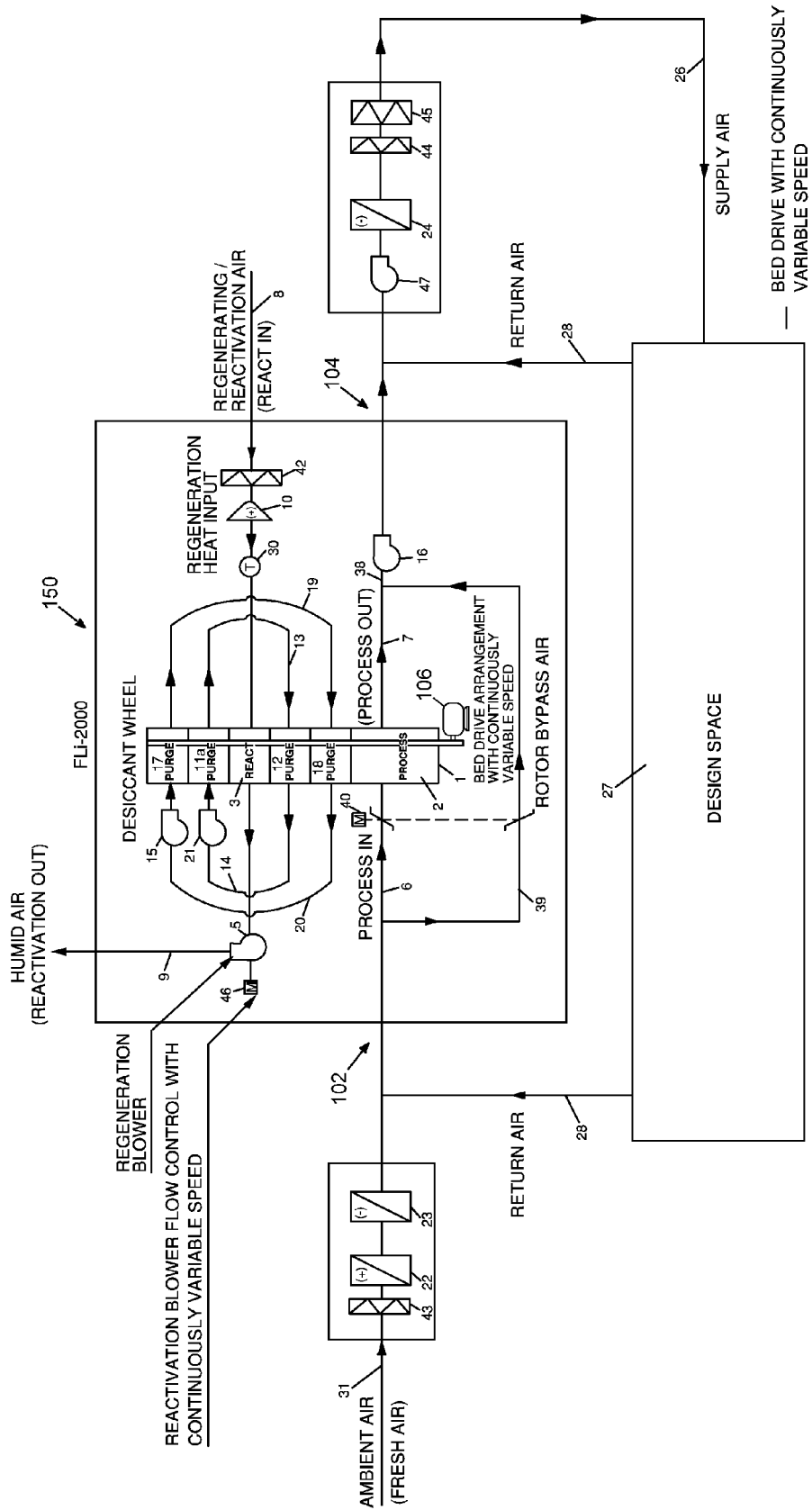
Figure 9E:
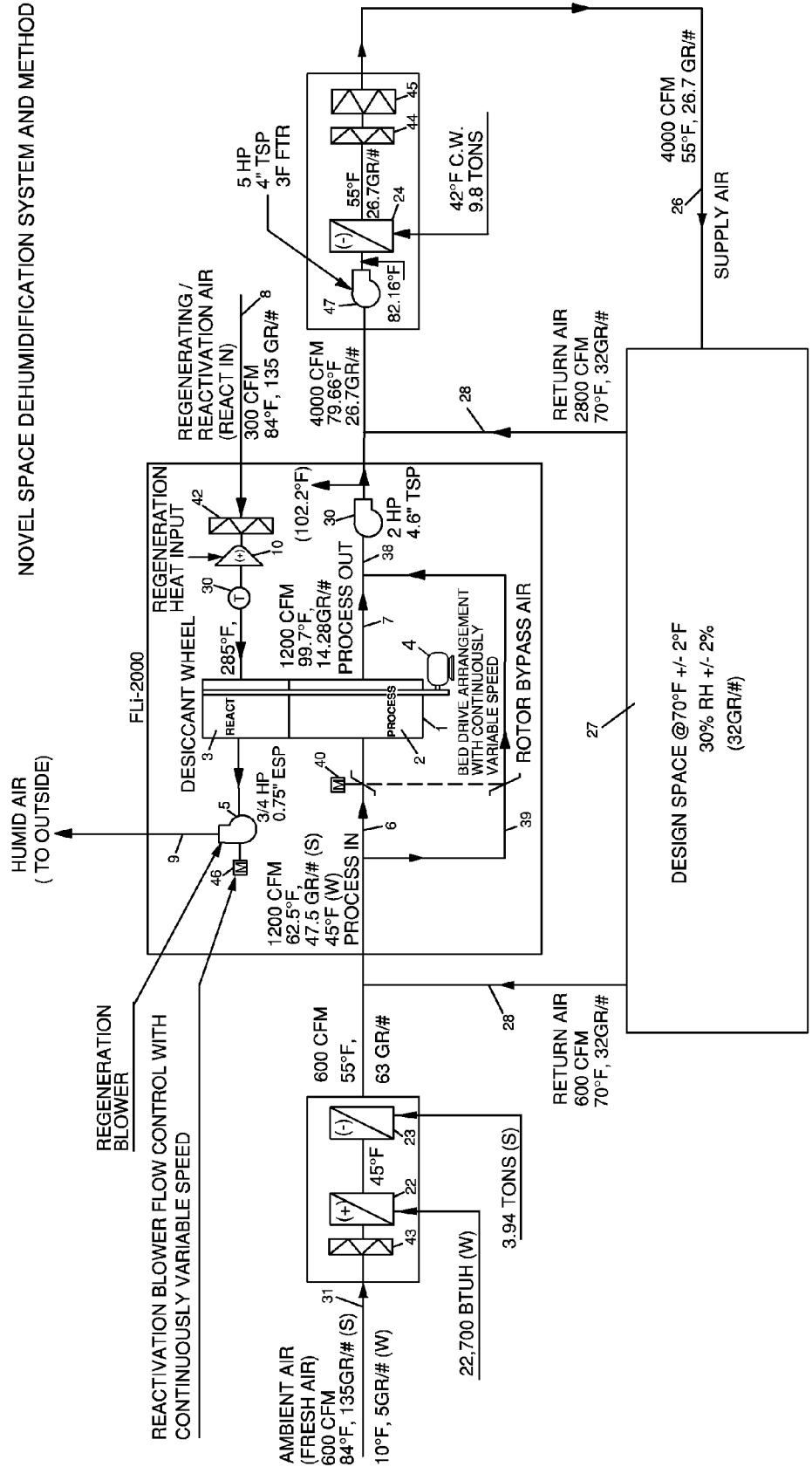

FIG. 9(a) is a schematic illustrating an embodiment of a space dehumidification system. There is an internal bypass 39 interlinked with the process airflow 6 through a face and bypass damper 40. Based on the humidity measured in the design space 27, and with instantaneous and changing loads, the face and bypass damper 40 modulates the amount of airflow passing through the wheel, while bypassing the rest of the airflow. As and when there is a need to supply fresh air 31 for the space design need, it is generally introduced at the inlet of the dehumidifier, and combined with the returning air 28 from the design space 27. Depending on the application, it may be advantageous to heat or cool the fresh air 31 before it mixes with the return air 28.

Dehumidifier outlet air 38 may be mixed with return air 28 before passing through a cooling coil 24 and filters 44, 45 and delivered as supply air 26 to the design space 27.

Reactivation airflow 8 passes through a heat source 10 which elevates the air temperature based on the specific design of the unit. The thermostat 30 controls the temperature as per the set point. To control the reactivation air flow, the reactivation blower 5 is continuously variable in speed, with a suitable design for the purpose. To get optimum performance, the rotor speed is also varied through a continuously variable speed bed drive arrangement 106. The term "rotational driver", or "driver" or similar may be used in this application to indicate any type of driving system, for example electric, hydraulic, pneumatic, or other.

FIG. 9(*b*) is a schematic illustrating a second embodiment 120 of a space dehumidification system. This embodiment has a purge sector 11 at the wheel 1. The purge sector 11 can vary from 5% to 40% of the total bed area, the remainder being divided between process area 2 and reactivation area 3. Air 12 is passed through purge sector 11, where the wheel 1 is hot; it produces preheated air 13 that subsequently passes through the reactivation sector 3, thereby reducing the reactivation energy input needed. Air 12 also cools that portion of the wheel before entering the process zone 2, whereby the dehumidification performance through the process sector 2 is improved. In addition, less heat is imparted to the process air 7 because the bed is cooler when it enters the process sector 2.

FIG. 9(*c*) is a schematic illustrating a space dehumidification system 140. A pair of purge sectors 11*a*, 12 is at the wheel 1. The air in the sectors 11*a*, 12 is circulated in a closed loop using an air mover 15. Heat from the wheel in section 12 following the reactivation sector may be picked up by airflow 13 and passed on to preheat the wheel in purge sector 11*a* following the process sector. Thus the wheel 1 will require less regeneration energy.

FIG. 9(*d*) is a schematic illustrating an embodiment 150 space dehumidification system. This is similar to the example in FIG. 9(*c*) except that one more pair of purge sectors 17, 18, has been added. A given amount of air 13, 19 is circulated through these pairs of sectors in two separate closed loops with separate fans 15, 21. As stated previously, the airflow in each of the closed loops may be in either direction depending on which is most advantageous.

FIG. 9(*e*) shows a schematic example of a space dehumidification system. This example is a pharmaceutical production area, for which design conditions of 15% and 30% RH at 75° F. have been selected for the room 27. The total supply air quantity 26 calculated in this example is 4000 cfm. To satisfy the space cooling needs and moisture removal, 600 cfm is taken as return air 28. The required fresh air 31 (600 cfm) is passed over cooling coil 23 and mixed with return air 28. The face and bypass damper 40 controls the airflow through bypass 39 and desiccant wheel 1. The return air 28 (2800 cfm) is mixed with the process out air 7 to provide the desired supply air flow 26. The total air is then passed through cooling coil 24 to provide the desired temperature for room 27.

Figure 10:
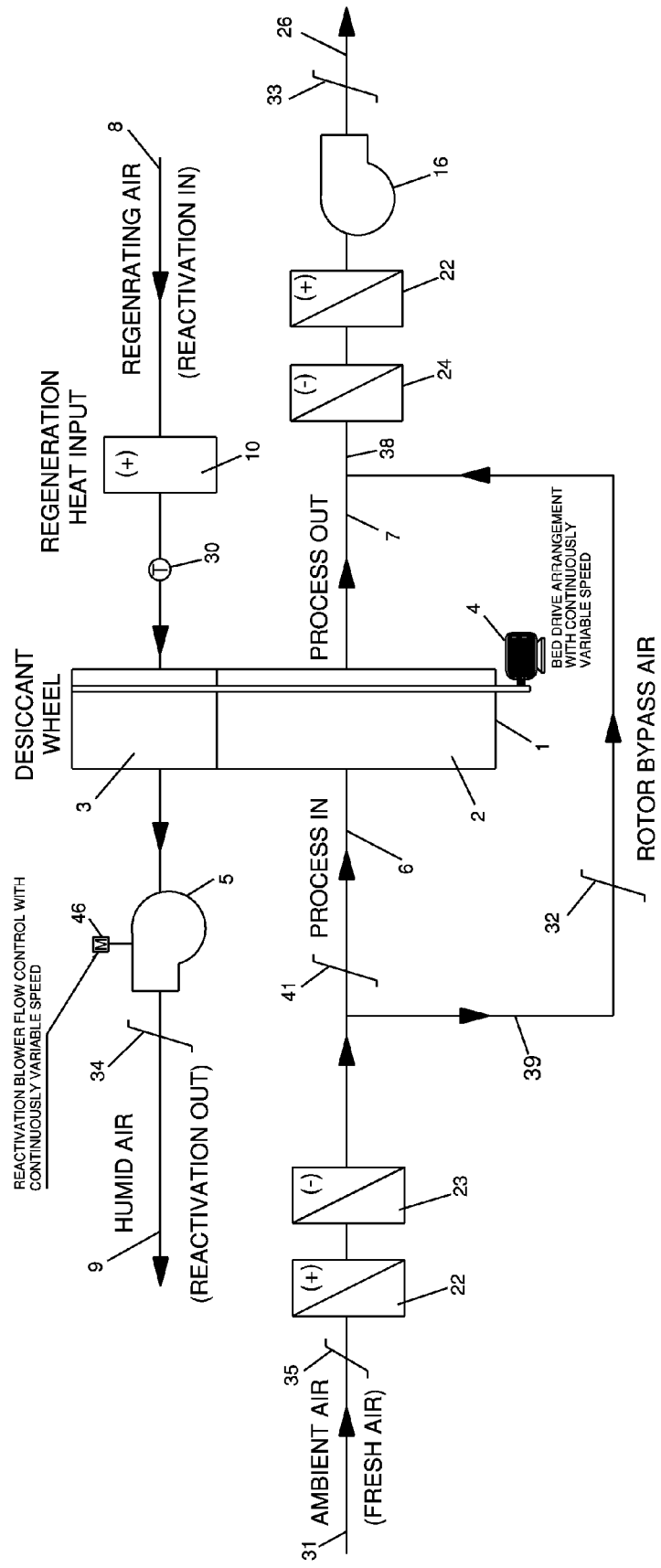
FIG. 10: is a schematic showing an embodiment of the present invention as a flow chart for process drying/dehumidification system.

FIG. 10 is a flow chart of an embodiment of the present invention for a process drying/dehumidification system. Ambient air 31 is passed through the cooling coil 23 to reduce the moisture load and is cooled. Bypass damper 32 modulates the airflow to be passed through desiccant wheel 1 and the remainder through bypass 39. The mixed air 38 (process out 7 and bypass air 39) is passed over heating 24/cooling 22 sources and is tempered depending upon the requirement of the supply air 26.

The regeneration flow 8 is also controlled with the help of the damper 34 generally positioned after the regeneration blower 5. The regeneration heat input 10 can be electric, steam, gas burner or from a variety of heat sources that can elevate the temperature based on the specific design of the unit. This temperature is controlled by thermostat 30

Figure 11A:
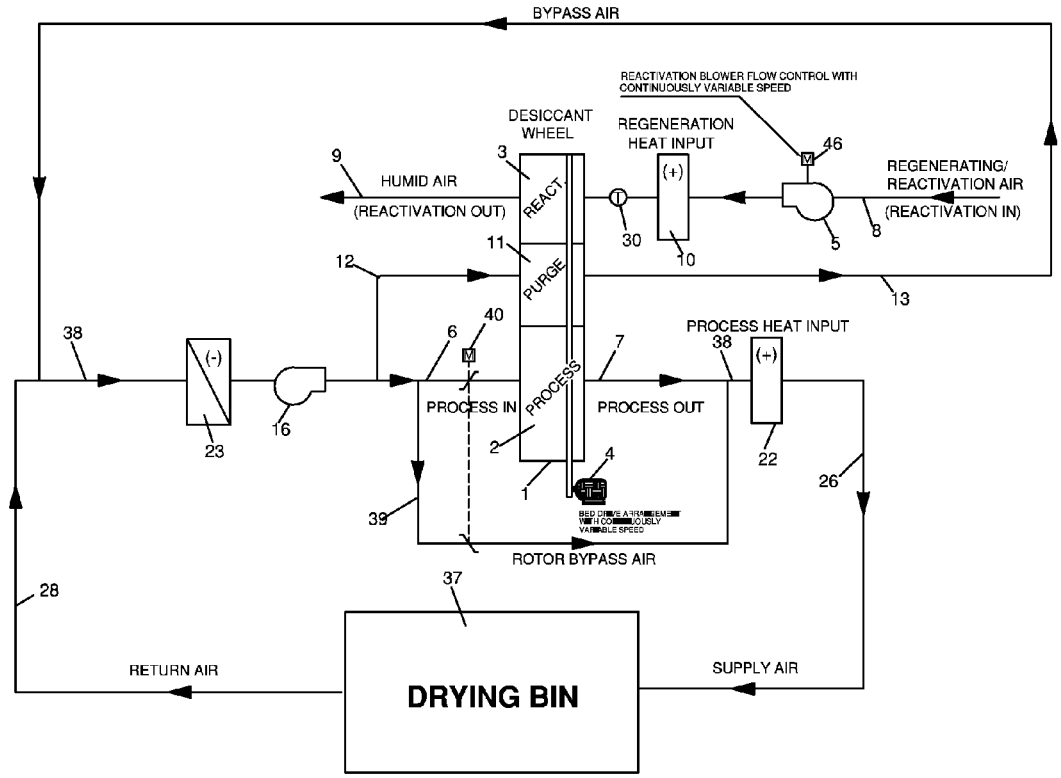
FIG. 11(a&b): is a schematic and embodiment of the present invention as a diagram showing a product drying system and method.
Figure 11B:
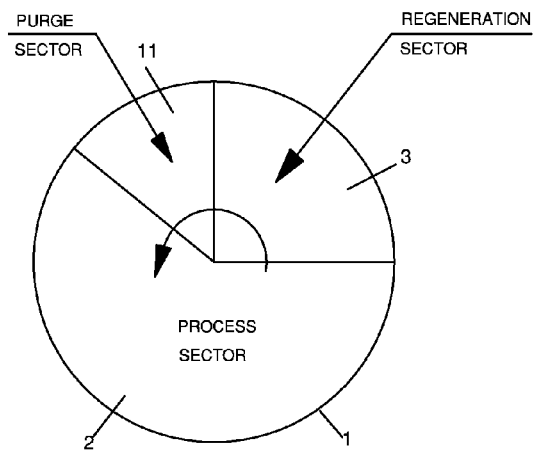

FIG. 11(*a*) shows a product drying system and method. In this system, based on the conditions required in the drying bin 37, the mixed air (process out 7 and the bypass air 39) 38 is passed over a process heat input 22 to provide the necessary drying temperature. The return air 28 is cooled through a cooling coil 23 and blown through the process sector 2 and the purge sector 11 of the rotor. The face and bypass damper 40 is used to control the flow that needs to bypass the dehumidifier. Air exiting the purge sector is recycled and mixed with the return air upstream of the cooling coil. This enables the dehumidifier to deliver drier air. The purge sector generally varies from 5 to 40% of the total area, the remainder being divided between process sector 2 and reactivation sector 3. The reactivation inlet temperature is controlled through thermostat 30.

FIG. 11(*b*) shows the desiccant bed/wheel 1 from another angle where the various sectors are identified. Although shown in a particular way, the sector division may vary.

Figure 12:
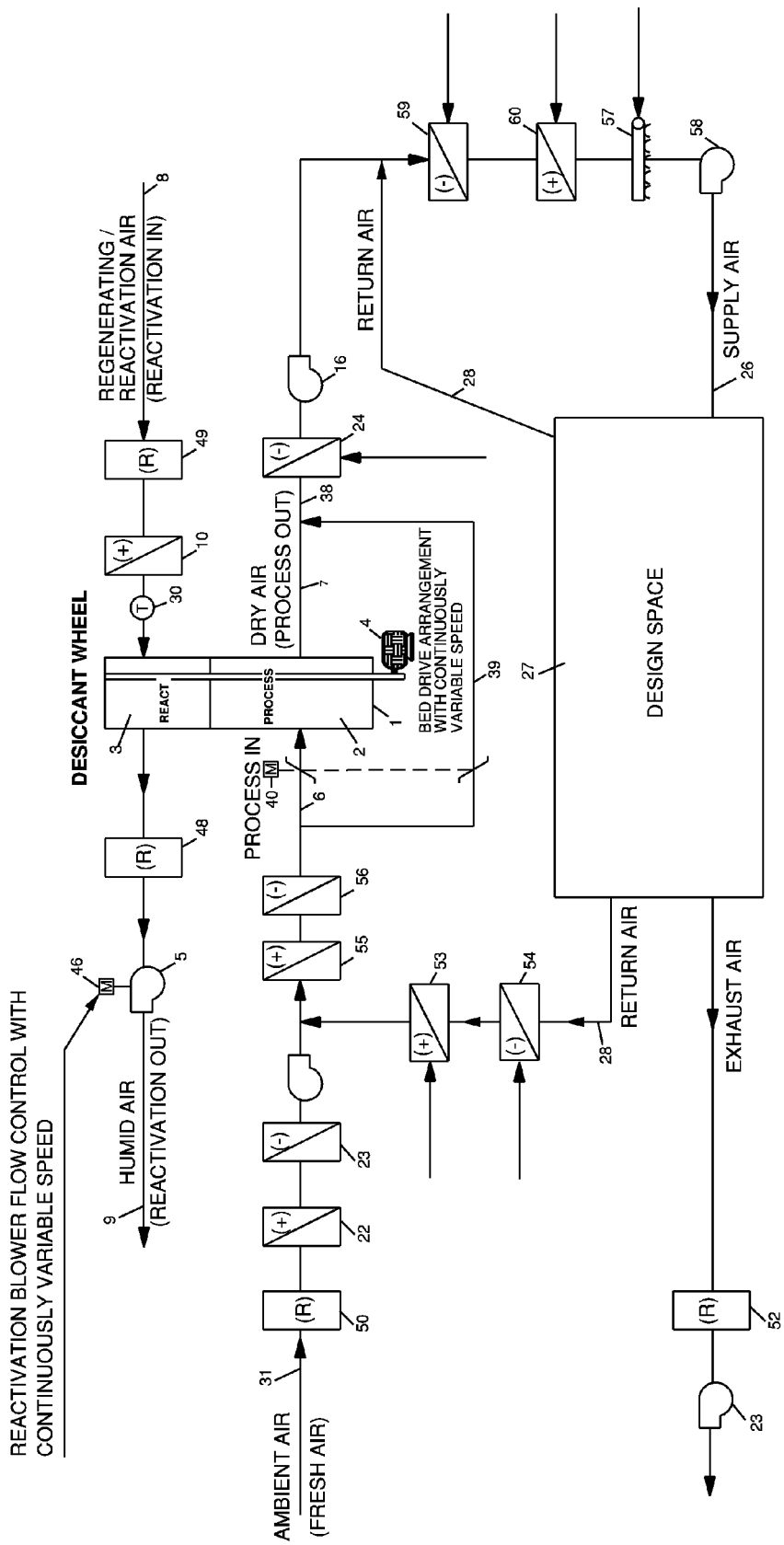
FIG. 12: is a schematic showing an embodiment of the system and method of present invention and also includes several HVAC components that can be enabled/used or disabled/not used.

FIG. 12 is a flow schematic showing various HVAC element options. Each element may be included or not included based on the performance requirements of the application. The overall supply air quantity to be passed through cooling coil 59/heating source 60/humidifier 57 is based on the requirement of the space to be conditioned. The return air 28 may pass through a cooling coil 54 or heating coil 53 to give a desired condition for mixing with the fresh air 31. The fresh air 31 may pass through heat recovery unit 50, if the required temperature needs to be increased and heating is required via the heat source 22. Fresh air may be cooled, if advantageous, using the cooling coil 23. The mixed air passes through heating source 55 and cooling source 56, based on the requirement, and then passes through face and bypass damper 40. This controls the flow that needs to pass through the desiccant wheel and be dehumidified. The exhaust air passes through heat recovery unit 52 to the outside through blower 23. The regeneration air passes through heat recovery unit 49 and then goes through heating source 10 to elevate the temperature as per the specific design of the unit. The reactivation airflow going out of the reactivation sector 3 passes through heat recovery sector 48 and through regeneration blower 5. The use of heat recovery unit 52 reduces the load. The thermostat 30 controls the temperature of reactivation inlet after the heat source, or alternatively may be located and control the reactivation air temperature leaving the desiccant wheel.

As explained earlier, the invention relates to a method and a system for the capacity control of the desiccant dehumidifier, which has an active desiccant wheel. As there are instantaneously changing moisture loads, there is a need to control the capacity of the dehumidifying unit and system. While there are several currently known and practiced control methods for reducing the reactivation usage, this invention provides a novel method of substantially further reducing the reactivation energy compared to earlier known methods.

In the present invention, the fundamental approach is to continuously provide a means to continuously vary the amount of air that will bypass the desiccant wheel, out of the total process flow. This reduction in process flow through the desiccant unit generally tracks the change in instantaneous moisture loads. When the process flow through the desiccant wheel is reduced, there is no longer a necessity to retain full regeneration flow through the reactivation sector of the wheel. Where the regeneration flow is correspondingly reduced in some defined correlation, a considerable reduction is achieved in regeneration energy usage. In this invention, through a control function, the regeneration flow rate can be made to continuously reduce or increase based on the continuously varying process flow rate through the process sector. With the changes in technology, it is today economical and commonplace to use variable speed drives, based on several known methods, which now allow continuous varying of reactivation air flow.

Similarly, it is also a basis of the invention to use such technology for continuous speed variance of the rotational speed of the wheel, also through a correlating control function. In this, the development of the control function, use is made of the knowledge of the mathematical modeling tool "DRI Cal", or any other similar tool e.g. "Procal", both of which are similar tools, currently, in use worldwide for the selection of a desiccant unit/wheel geometry and flows.

While developing this invention of continuously controlling the process variables of the dehumidifier, the energy usage was compared with several known and practiced control methods. To develop the invention, a sample project was selected, with physical facts and assumptions, typical of the design of a dehumidification application. For this, 30% RH at 70 F was selected as the design condition. To get a better spectrum of the energy saving potential, a lower RH design of 15% at 70° F., also for the same pharmaceutical application, was selected. The city of Zebulon, N.C. was selected for weather conditions typical of the Southeastern U.S. However, to demonstrate the effect of more humid climates, the city of Mumbai, India was selected as being typical. A flow chart was made and prepared of the sample project/design. With the given hourly weather data available and used today for providing a more detailed load profile of the project design, ambient weather bins were created in increments of 10 grains/lb. air with mean coincident dry bulb temperature and frequency of occurrence in hours/year. This allowed the calculation of several "bins" of the instantaneous loads, to enable simple simulation, to estimate the total energy usage with each control method. Table 1 below shows the hourly bin data that was created for both the cities, Zebulon, N.C., USA, and Mumbai in India.

TABLE 1

HOURLY BIN DATA

| ZEBULON, NORTH CAROLINA | | | MUMBAI (INDIA) | | |
|---|---|---|---|---|---|
| OSA Humidity (Gr/Lbs) | MCDB (° F.) | FREQ Hrs/Year | OSA Humidity (Gr/Lbs) | MCDB (° F.) | FREQ Hrs/Year |
| 145 | 89 | 1 | 175 | 90.7 | 1 |
| 135 | 84 | 45 | 165 | 87.5 | 20 |
| 125 | 80 | 265 | 155 | 85.5 | 321 |
| 115 | 78 | 493 | 145 | 83.9 | 1396 |
| 105 | 76 | 692 | 135 | 82.5 | 2203 |
| 95 | 72 | 602 | 125 | 82.3 | 1108 |
| 85 | 71 | 597 | 115 | 80.9 | 484 |
| 75 | 67 | 688 | 105 | 80.1 | 528 |
| 65 | 64 | 753 | 95 | 78.2 | 604 |
| 55 | 61 | 694 | 85 | 77.7 | 683 |
| 45 | 56 | 727 | 75 | 76.4 | 607 |
| 35 | 50 | 976 | 65 | 74.5 | 505 |
| 25 | 43 | 1190 | 55 | 77.6 | 213 |
| 15 | 37 | 841 | 45 | 82.7 | 68 |
| 5 | 24 | 196 | 35 | 84.6 | 19 |

With this method, the reactivation energy usage analysis is more defined compared to applying the design data on the basis of two or three design points, for all the three control methods considered and defined below.

(a) Control option 1—Fixed Reactivation Airflow, Fixed Reactivation Inlet temperature, fixed rotor speed, variable process flow;
(b) Control option 2—Fixed Reactivation Airflow, Fixed Reactivation Discharge temperature, fixed rotor speed, variable process flow. (This is, for the purposes of the invention, considered as a baseline control option);
(c) Control option 3—Fixed Reactivation Inlet Temperature, Variable Reactivation Airflow, variable rotor speed, variable process flow through the wheel with the balance bypassing the wheel.

Based on the hourly bin data, and the aforementioned three control methods/options, option 3 being based on the current invention, the energy used in therms/year for all three options was charted and compared. The comparison is given below in Tables 2, 3, 4, 5 and 6. The amount of energy used in the after cooler is also tabulated in tables 5 and 6, which clearly show that, in addition to the reduction in regeneration energy usage, there is a considerable overall reduction in cooling energy usage as well.

Figure 13A:
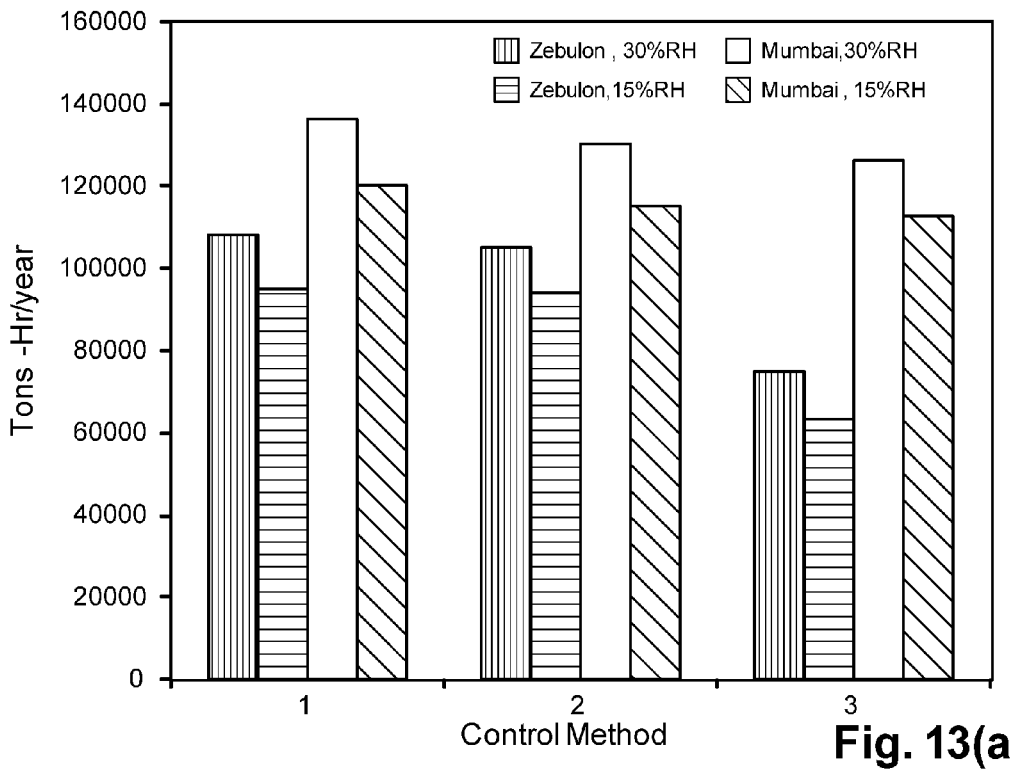
FIG. 13(a,b&c): is a graphical representation showing energy saving with the present invention in comparison with the prior art

FIG. 13(a): compares the annual post cooling requirement when different control options are used.

Figure 13B:
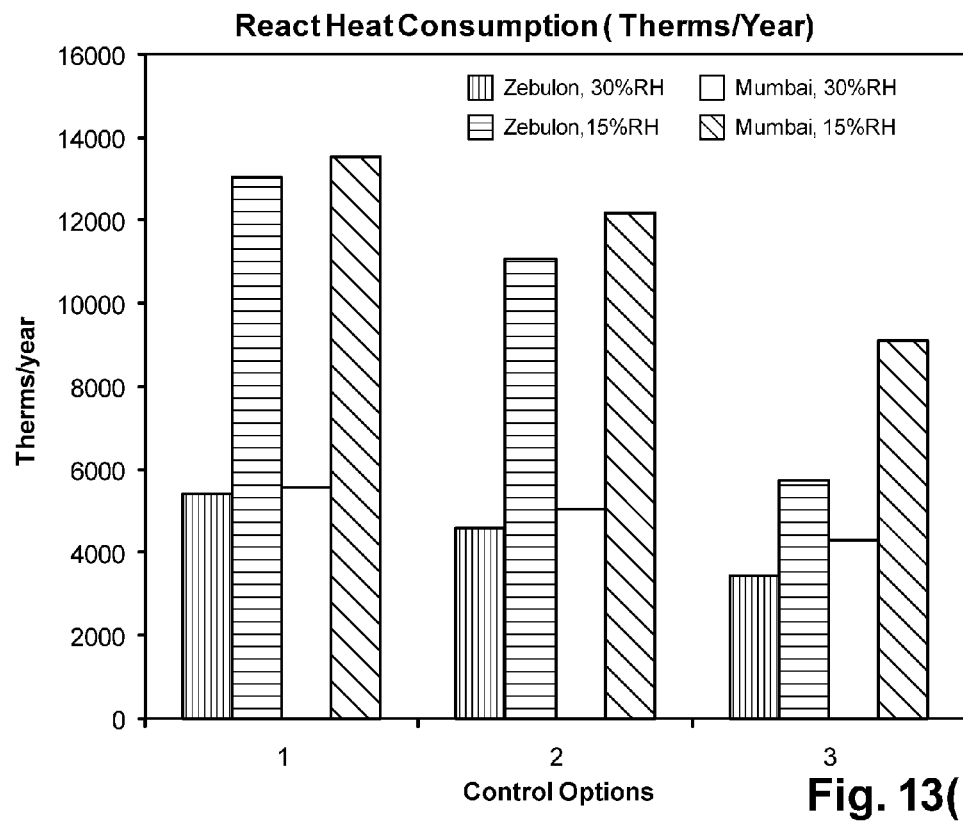

Referring now to FIG. 13(b), this graph shows the comparison of reactivation heat consumption (In Therms/Year) for control options 1, 2 and 3. The case study is for 15% and 30% RH conditions considered for Zebulon and Mumbai. It is observed that in case of control option 2 (baseline control option), in Zebulon for the 15% RH design the consumption of reactivation heat is 11071 Therms/year. If control option 1 is selected, this rises to 13059 Therms/year. However, if control option 3 is selected, the consumption comes down considerably to 5747 Therms/year. Tables 2, 3 and 4 provide complete data for the energy consumed as per control options 1, 2 and 3 for 15% and 30% design RH in Mumbai and Zebulon. Table 5 is a summary of energy consumed in control option 1, 2 and 3 for the 30% RH design and Table 6 is a summary of Energy consumption per Control Option 1, 2 and 3 for 15% RH design.

TABLE 2

Energy consumption data as per control option-1

| | RH Requirement = 30% | | RH Requirement = 15% | |
|---|---|---|---|---|
| | Zebulon | Mumbai | Zebulon | Mumbai |
| React. Heat (Therms/Year) | 5404 | 5593 | 13059 | 13518 |
| Post cooling requirement (Ton- Hours/Year) | 107942 | 136505 | 95194 | 120327 |

TABLE 3

Energy consumption data as per control option-2

| | RH Requirement = 30% | | RH Requirement = 15% | |
|---|---|---|---|---|
| | Zebulon | Mumbai | Zebulon | Mumbai |
| React. Heat (Therms/Year) | 4578 | 5058 | 11071 | 12172 |
| Post cooling requirement (Ton- Hours/Year) | 105031 | 130502 | 94185 | 115117 |

TABLE 4

Energy consumption data as per control option-3

|  | RH Requirement = 30% | | RH Requirement = 15% | |
| --- | --- | --- | --- | --- |
|  | Zebulon | Mumbai | Zebulon | Mumbai |
| React. Heat (Therms/Year | 3441 | 4326 | 5747 | 9125 |
| Post cooling requirement (Ton- Hours/Year) | 74766 | 126203 | 63433 | 112516 |

TABLE 5

Energy consumption summary as per control options - 1, 2, 3 for the 30% RH Design Example

|  | Zebulon | | Mumbai | |
| --- | --- | --- | --- | --- |
|  | React. Heat (Therms/Year) | Post cooling requirement (Ton-Hours/Year) | React. Heat (Therms/Year) | Post cooling requirement (Ton-Hours/Year) |
| Control option -1 | 5404 | 107942 | 5593 | 136505 |
| Control option -2 | 4578 | 105031 | 5058 | 130502 |
| Control option -3 | 3441 | 74766 | 4326 | 126203 |

TABLE 6

Energy consumption summary as per control options - 1, 2, 3 for the 15% RH Design Example

|  | Zebulon | | Mumbai | |
| --- | --- | --- | --- | --- |
|  | React. Heat (Therms/Year) | Post cooling requirement (Ton-Hours/Year) | React. Heat (Therms/Year) | Post cooling requirement (Ton-Hours/Year) |
| Control option -1 | 13,059 | 95,194 | 13,518 | 120,327 |
| Control option -2 | 11,071 | 94,185 | 12172 | 115117 |
| Control option -3 | 5747 | 63433 | 9125 | 112516 |

Initially energy usage analysis for the invention, per Control Option 3, was benchmarked against the baseline of control option 2. It was further considered useful to complete the analysis using another commonly and currently used method of dehumidifier capacity control, Control Option 1. Accordingly, the resultant % reduction in energy with the invention has been compared between all three options. Control Option 2 is the baseline in Table 7. Control Option 1 is the baseline in Table 8.

Figure 13C:
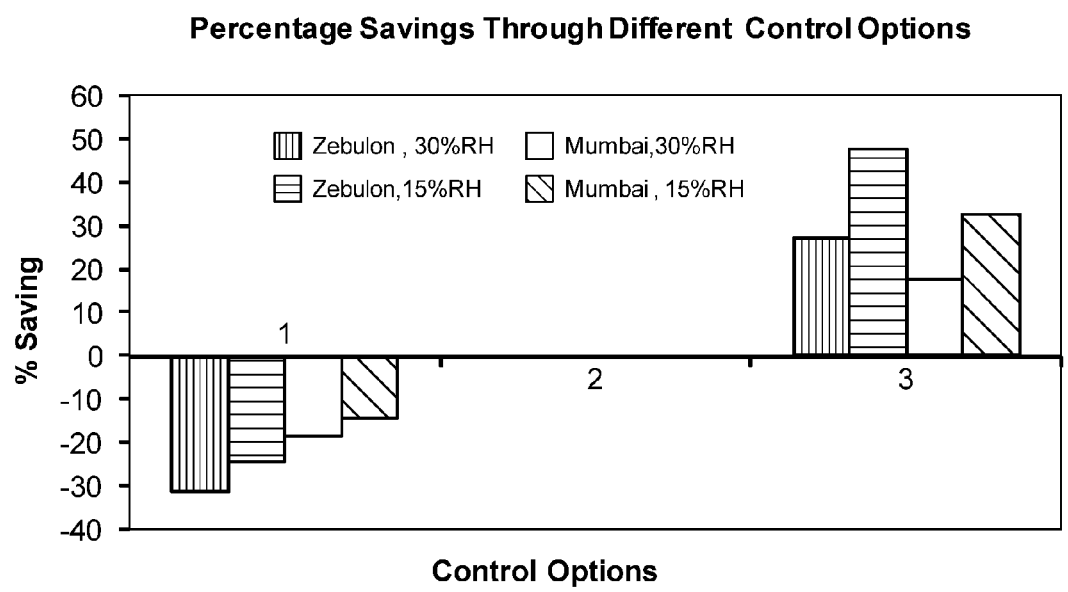

Referring now to FIG. 13(c), this graph shows the percentage savings in regeneration heat when using different control options. As shown, by using Control Option 3, the percentage saving can be as high as 47%. However if the Control Option 1 is selected as another baseline, there is a further increase in the percentage saving. This would then be a comparison between Control Option 1, and 3. Table 7 provides a detailed energy consumption comparison between Control Options 1, 2 and 3

TABLE 7

| Energy Consumption Analysis | | | | |
| --- | --- | --- | --- | --- |
|  | RH Requirement = 30% Zebulon React. Heat % | RH Requirement = 30% Mumbai React. Heat % | RH Requirement = 15% Zebulon React. Heat % | RH Requirement = 15% Mumbai React. Heat % |
| Control option -1 | 130.8 | 118 | 124 | 113.8 |
| Control option -2 | 100 | 100 | 100 | 100 |
| Control option -3 | 72.6 | 82.5 | 52.5 | 67.2 |
|  | RH Requirement = 30% Zebulon Post cooling % | RH Requirement = 30% Mumbai Post cooling % | RH Requirement = 15% Zebulon Post cooling % | RH Requirement = 15% Mumbai Post cooling % |
| Control option -1 | 100 | 105 | 105 | 113.8 |
| Control option -2 | 100 | 100 | 100 | 100 |
| Control option -3 | 99.5 | 94 | 88.5 | 90.6 |

TABLE 8

| Energy Consumption Analysis | | | | |
| --- | --- | --- | --- | --- |
|  | RH Requirement = 30% Zebulon React. Heat % | RH Requirement = 30% Mumbai React. Heat % | RH Reqmt. = 15% Zebulon React. Heat % | RH Requirement = 15% Mumbai React. Heat % |
| Control option -1 | 100 | 100 | 100 | 100 |
| Control | 69 | 82 | 76 | 86 |

TABLE 8-continued

Energy Consumption Analysis

| | | | | |
|---|---|---|---|---|
| option -2 Control option -3 | 42.4 | 64.5 | 28.5 | 53.2 |

| | RH Requirement = 30% Zebulon Post cooling % | RH Requirement = 30% Mumbai Post cooling % | RH Requirement = 15% Zebulon Post cooling % | RH Requirement = 15% Mumbai Post cooling % |
|---|---|---|---|---|
| Control option -1 | 100 | 100 | 100 | 100 |
| Control option -2 | 100 | 95 | 95 | 86 |
| Control option -3 | 99.5 | 89 | 83.5 | 76.6 |

From the foregoing it is evident that this invention presents a novel system and method for dehumidifier capacity control, providing a significant energy saving compared to known arts and methods The system of the invention also incorporates several other advantages such as the design of the basic cabinet and plenums so reactivation sector size can be selected from the range of 12% to 45% of the total desiccant rotor face area and set during fabrication with no modification to the cabinet design. In addition, if desired, the design of the basic cabinet and plenums is such that reactivation sector size can be manually field adjusted anywhere in the range of 66% to 150% of its original design value using hand tools, to adapt to modified performance requirements. When the system is used with a purge sector with concurrent air flow, the basic cabinet and plenums design enables a purge sector size in the range of 2% to 25% of the rotor face area to be added without major modification of the design.

Although the invention has been described with reference to specific embodiments, it will be understood by those skilled in the art that various changes may be made without departing from the spirit or scope of the invention. For instance, the numerous details set forth herein, for example, details relating to the configuration and operation of the presently preferred embodiment of the active desiccant module and hybrid systems, are provided to facilitate the understanding of the invention and are not provided to limit the scope of the invention. Accordingly, the disclosure of embodiments of the invention is intended to be illustrative of the scope of the invention and is not intended to be limiting.

What is claimed is:

1. A method of controlling an active desiccant dehumidifier, the method comprising:
   modulating the airflow through a process sector to control the amount of dehumidification;
   modulating the airflow through a reactivation sector as a function of the modulation of the process airflow; and
   modulating the rotational speed of a desiccant wheel as a function of the modulation of the process airflow.

2. The method of claim 1 wherein the modulation of process airflow comprises bypassing a portion of the process airflow around the desiccant wheel.

3. The method of claim 1 wherein the modulation of process airflow comprises modulating a damper controlling the process airflow.

4. The method of claim 1 wherein the modulation of process airflow comprises simultaneously controlling the airflow through the desiccant wheel and the airflow bypassing the desiccant wheel so the total process airflow remains substantially constant.

5. The method of claim 1 wherein the modulation of process airflow comprises varying the operating characteristics of a process airflow air mover.

6. The method of claim 1 wherein the minimum airflow through the process sector is limited to a predetermined value.

7. The method of claim 1 wherein the heated temperature of the air entering the reactivation sector is maintained at a fixed value.

8. The method of claim 7 wherein the heated temperature of the reactivation air is maintained at the fixed value by modulating a heat input to a reactivation air heater.

9. The method of claim 1 wherein the temperature of the reactivation air leaving the reactivation sector is maintained at a fixed value.

10. The method of claim 9 wherein the heated temperature of the reactivation air is controlled by modulating a heat input to a reactivation air heater.

11. The method of claim 1 wherein a reactivation air heat source is maintained at a fixed value and the temperature of the reactivation heated air is not controlled but allowed to vary, increasing with reduced reactivation airflow and decreasing with greater reactivation airflow.

12. The method of claim 11 wherein the reactivation air heat source is activated whenever there is airflow through the reactivation sector.

13. The method of claim 1 wherein the modulation of the reactivation airflow comprises modulating a damper in the reactivation airstream.

14. The method of claim 1 wherein the modulation of the reactivation airflow comprises varying the operating characteristics of the reactivation air mover.

15. The method of claim 1 wherein the modulation of the reactivation airflow comprises bypassing a portion of the reactivation air around the desiccant wheel.

16. The method of claim 1 wherein the minimum airflow through the reactivation sector is limited to a predetermined value.

17. The method of claim 1 wherein the modulation of the rotational speed of the desiccant wheel comprises varying the operating characteristics of the desiccant wheel rotational driver.

18. The method of claim 1 wherein the effective rotational speed of the wheel comprises intermittently operating the desiccant wheel rotational driver such that the percentage of time the rotational driver operates is proportional to the control function desired.

19. The method of claim 1 wherein the minimum rotational speed of the desiccant wheel is limited to a predetermined value.

20. The method of claim 1 wherein the control function of the modulation of the reactivation airflow is a linear function.

21. The method of claim 1 wherein the control function of the modulation of the reactivation airflow is an exponential function with the exponent between 0.5 and 2.0.

22. The method of claim 1 wherein the control function of the modulation of the desiccant wheel rotational speed is a linear function.

23. The method of claim 1 wherein the control function of the modulation of the desiccant wheel rotational speed is an exponential function with the exponent between 0.5 and 2.0.

24. The method of claim 1 wherein the dehumidifier also contains an intermediate purge sector between the reactivation and process sectors that pre-treats a portion of the reactivation air.

25. The method of claim 24 wherein the airflow passing through the purge sector is modulated in direct proportion to the reactivation airflow.

26. The method of claim 1 wherein the dehumidifier also contains one or more pairs of intermediate purge sectors disposed so they act as a buffer between the process and reactivation sectors and having means to circulate a closed flow of air through them.

27. The method of claim 26 wherein the airflow circulated through the purge sectors is modulated in direct proportion to the reactivation airflow.

28. The method of claim 26 wherein the airflow circulated through the purge sectors is modulated in direct proportion to the desiccant wheel rotational speed.

29. A method of controlling an active desiccant dehumidifier, the method comprising:
modulating the airflow through a process sector to control the amount of dehumidification;
modulating the airflow through a reactivation sector as a function of the modulation of the process airflow.

30. The method of claim 29 wherein the modulation of process airflow comprises bypassing a portion of the process airflow around a desiccant wheel.

31. The method of claim 29 wherein the modulation of process airflow comprises modulating a damper controlling the process airflow.

32. The method of claim 29 wherein the modulation of process air comprises simultaneously controlling the airflow through a desiccant wheel and the airflow bypassing the desiccant wheel so the total airflow remains substantially constant.

33. The method of claim 29 wherein the modulation of process airflow comprises varying the operating characteristics of the process air mover.

34. The method of claim 29 wherein the minimum airflow through the process sector is limited to a predetermined value.

35. The method of claim 29 wherein the heated temperature of the air entering the reactivation sector is maintained at a fixed value.

36. The method of claim 35 wherein the heated temperature of the reactivation air is maintained at a fixed value by modulating the heat input to the reactivation air heater.

37. The method of claim 29 wherein the temperature of the reactivation air leaving the reactivation sector is maintained at a fixed value.

38. The method of claim 37 wherein the heated temperature of the reactivation air is controlled by modulating the heat input to the reactivation air heater.

39. The method of claim 29 wherein the reactivation air heat source is maintained at a fixed value and the temperature of the reactivation heated air is not controlled but allowed to vary, increasing with reduced reactivation airflow and decreasing with greater reactivation airflow.

40. The method of claim 39 wherein the reactivation air heat source is activated whenever there is airflow through the reactivation sector.

41. The method of claim 29 wherein the modulation of the reactivation airflow comprises modulating a damper in the reactivation airstream.

42. The method of claim 29 wherein the modulation of the reactivation airflow comprises varying the operating characteristics of the reactivation air mover.

43. The method of claim 29 wherein the modulation of the reactivation airflow comprises bypassing a portion of the reactivation air around the desiccant wheel.

44. The method of claim 29 wherein the minimum airflow through the reactivation sector is limited to a predetermined value.

45. The method of claim 29 wherein a modulation of the rotational speed of a desiccant wheel comprises varying the operating characteristics of a desiccant wheel rotational driver.

46. The method of claim 45 wherein the effective rotational speed of the wheel comprises intermittently operating the desiccant wheel rotational driver such that the percentage of time the rotational driver operates is proportional to the control function desired.

47. The method of claim 45 wherein the minimum rotational speed of the desiccant wheel is limited to a predetermined value.

48. The method of claim 29 wherein the control function of the modulation of the reactivation airflow is a linear function.

49. The method of claim 29 wherein the control function of the modulation of the reactivation airflow is an exponential function with the exponent between 0.5 and 2.0.

50. The method of claim 45 wherein the control function of the modulation of the desiccant wheel rotational speed is a linear function.

51. The method of claim 45 wherein the control function of the modulation of the desiccant wheel rotational speed is an exponential function with the exponent between 0.5 and 2.0.

52. A method of controlling an active desiccant dehumidifier, the method comprising:
modulating the airflow through a reactivation sector while maintaining a constant airflow through a process sector to control the amount of dehumidification, and
modulating the rotational speed of a desiccant wheel as a function of the modulation of the reactivation airflow.

53. The method of claim 52 wherein the heated temperature of the air entering the reactivation sector is maintained at a fixed value.

54. The method of claim 52 wherein the heated temperature of the reactivation air is maintained at a fixed value by modulating the heat input to the reactivation air heater.

55. The method of claim 52 wherein the temperature of the reactivation air leaving the reactivation sector is maintained at a fixed value.

56. The method of claim 55 wherein the heated temperature of the reactivation air is controlled by modulating the heat input to the reactivation air heater.

57. The method of claim 52 wherein the reactivation air heat source is maintained at a fixed value and the temperature of the reactivation heated air is not controlled but allowed to vary, increasing with reduced reactivation airflow and decreasing with greater reactivation airflow.

58. The method of claim 52 wherein the reactivation heat source is activated whenever there is airflow through the reactivation sector.

59. The method of claim 52 wherein the modulation of the reactivation airflow is achieved by modulating a damper in the reactivation airstream.

60. The method of claim 52 wherein the modulation of the reactivation airflow is achieved by varying the operating characteristics of the reactivation air mover.

61. The method of claim 52 wherein the modulation of the reactivation airflow is achieved by bypassing a portion of the reactivation air around the desiccant wheel.

62. The method of claim 52 wherein the minimum airflow through the reactivation sector is limited to a predetermined value.

63. The method of claim 52 wherein the modulation of the rotational speed of the desiccant wheel is achieved by varying the operating characteristics of the desiccant wheel rotational driver.

64. The method of claim 52 wherein the effective rotational speed of the wheel is achieved by intermittently operating a desiccant wheel rotational driver such that the percentage of time the rotational driver operates is proportional to the control function desired.

65. The method of claim 52 wherein the minimum rotational speed of the desiccant wheel is limited to a predetermined value.

66. The method of claim 52 wherein the control function of the modulation of the desiccant wheel rotational speed is a linear function of the reactivation airflow.

67. The method of claim 52 wherein the control function of the modulation of the desiccant wheel rotational speed is an exponential function of the reactivation airflow, with the exponent between 0.5 and 2.0.

68. An active desiccant dehumidifier system comprised of a housing containing at least a desiccant wheel having a process sector with airflow means; a reactivation sector with airflow means; a means of rotating the desiccant wheel through the process and reactivation sectors; reactivation air heating means; and a control system having control system logic comprising:
 modulating the airflow through the process sector to control the amount of dehumidification;
 modulating the airflow through the reactivation sector as a function of the modulation of the process airflow; and
 modulating the rotational speed of the desiccant wheel as a function of the modulation of the process airflow.

69. The system of claim 68 wherein the modulation of process airflow comprises bypassing a portion of the process airflow around the desiccant wheel.

70. The system of claim 68 wherein the modulation of process airflow comprises modulating a damper controlling the process airflow.

71. The system of claim 68 wherein the modulation of process air comprises simultaneously controlling the airflow through the desiccant wheel and the airflow bypassing the desiccant wheel so the total airflow remains substantially constant.

72. The system of claim 68 wherein the modulation of process airflow comprises varying the operating characteristics of the process air mover.

73. The system of claim 68 wherein the minimum airflow through the process sector is limited to a predetermined value.

74. The system of claim 68 wherein the heated temperature of the air entering the reactivation sector is maintained at a fixed value.

75. The system of claim 74 wherein the heated temperature of the reactivation air is maintained at a fixed value by modulating a heat input to the reactivation air heating means.

76. The system of claim 68 wherein the temperature of the reactivation air leaving the reactivation sector is maintained at a fixed value.

77. The system of claim 76 wherein the heated temperature of the reactivation air is controlled by modulating the heat input to reactivation air heating means.

78. The system of claim 68 wherein the reactivation air heat source is maintained at a fixed value and the temperature of the reactivation heated air is not controlled but allowed to vary, increasing with reduced reactivation airflow and decreasing with greater reactivation airflow.

79. The system of claim 78 wherein the reactivation heat source is activated whenever there is airflow through the reactivation sector.

80. The system of claim 68 wherein the modulation of the reactivation airflow comprises modulating a damper in the reactivation airstream.

81. The system of claim 68 wherein the modulation of the reactivation airflow comprises varying the operating characteristics of the reactivation air mover.

82. The system of claim 68 wherein the modulation of the reactivation airflow comprises bypassing a portion of the reactivation air around the desiccant wheel.

83. The system of claim 68 wherein the minimum airflow through the reactivation sector is limited to a predetermined value.

84. The system of claim 68 wherein the modulation of the rotational speed of the desiccant wheel comprises varying the operating characteristics of the desiccant wheel rotational driver.

85. The system of claim 68 wherein the effective rotational speed of the wheel effectively comprises intermittently operating the desiccant wheel rotating means such that the percentage of time the rotating means operates is proportional to the control function desired.

86. The system of claim 68 wherein the minimum rotational speed of the desiccant wheel is limited to a predetermined value.

87. The system of claim 68 wherein the control function of the modulation of the reactivation airflow is a linear function.

88. The system of claim 68 wherein the control function of the modulation of the reactivation airflow is an exponential function with the exponent between 0.5 and 2.0.

89. The system of claim 68 wherein the control function of the modulation of the desiccant wheel rotational speed is a linear function.

90. The system of claim 68 wherein the control function of the modulation of the desiccant wheel rotational speed is an exponential function with the exponent between 0.5 and 2.0.

91. An active desiccant dehumidifier system comprised of a housing containing at least: a desiccant wheel having a process sector with airflow means; a reactivation sector with airflow means; a means of rotating the desiccant wheel through the process and reactivation sectors; reactivation air heating means; and a control system intended to improve the operating efficiency of the dehumidifier at part-load conditions; the control system logic comprising:
 modulating the airflow through a reactivation sector to control the amount of dehumidification; and
 modulating the rotational speed of a desiccant wheel as a function of the modulation of the reactivation airflow.

92. The system of claim 91 wherein the heated temperature of the air entering the reactivation sector is maintained at a fixed value.

93. The system of claim 91 wherein the heated temperature of the reactivation air is maintained at a fixed value by modulating the heat input to the reactivation air heating means.

94. The system of claim 91 wherein the temperature of the reactivation air leaving the reactivation sector is maintained at a fixed value.

95. The system of claim 94 wherein the heated temperature of the reactivation air is controlled by modulating the heat input to the reactivation air heating means.

96. The system of claim 91 wherein the reactivation air heat source is maintained at a fixed value and the temperature of the reactivation heated air is not controlled but allowed to vary, increasing with reduced reactivation airflow and decreasing with greater reactivation airflow.

97. The system of claim 96 wherein the reactivation heat source is activated whenever there is airflow through the reactivation sector.

98. The system of claim 91 wherein the modulation of the reactivation airflow is achieved by modulating a damper in the reactivation airstream.

99. The system of claim 91 wherein the modulation of the reactivation airflow is achieved by varying the operating characteristics of the reactivation airflow means.

100. The system of claim 91 wherein the modulation of the reactivation airflow is achieved by bypassing a portion of the reactivation air around the desiccant wheel.

101. The system of claim 91 wherein the minimum airflow through the reactivation sector is limited to a predetermined value.

102. The system of claim 91 wherein the modulation of the rotational speed of the desiccant wheel is achieved by varying the operating characteristics of the desiccant wheel rotating means.

103. The system of claim 91 wherein the effective rotational speed of the wheel is achieved by intermittently operating the desiccant wheel rotating means such that the percentage of time the rotating means operates is proportional to the control function desired.

104. The system of claim 91 wherein the minimum rotational speed of the desiccant wheel is limited to a predetermined value.

105. The system of claim 91 wherein the control function of the modulation of the desiccant wheel rotational speed is a linear function of the reactivation airflow.

106. The system of claim 91 wherein the control function of the modulation of the desiccant wheel rotational speed is an exponential function of the reactivation airflow, with the exponent between 0.5 and 2.0.

107. A method of controlling an active desiccant dehumidifier comprised of a housing containing at least: a desiccant wheel having a process sector with airflow means; a reactivation sector with airflow means; a means of rotating the desiccant wheel through the process and reactivation sectors; and reactivation air heating means; the control objective being to achieve improved operating efficiency at part-load conditions; the method comprising:
  modulating the airflow through a process sector to control the amount of dehumidification;
  modulating the airflow through a reactivation sector as a function of the modulation of the process airflow; and
  modulating the rotational speed of a desiccant wheel as a function of the modulation of the process airflow.

108. A method of controlling an active desiccant dehumidifier comprised of a housing containing at least: a desiccant wheel having a process sector with airflow means; a reactivation sector with airflow means; a means of rotating the desiccant wheel through the process and reactivation sectors; and reactivation air heating means; the control objective being to achieve improved operating efficiency at part-load conditions; the method comprising:
  modulating the airflow through a process sector to control the amount of dehumidification;
  modulating the airflow through a reactivation sector as a function of the modulation of the process airflow.

109. A method of controlling an active desiccant dehumidifier comprised of a housing containing at least: a desiccant wheel having a process sector with airflow means; a reactivation sector with airflow means; a means of rotating the desiccant wheel through the process and reactivation sectors; and reactivation air heating means; the control objective being to achieve improved operating efficiency at part-load conditions; the method comprising:
  modulating the airflow through the reactivation sector while maintaining a constant airflow through the process sector to control the amount of dehumidification, and
  modulating the rotational speed of a desiccant wheel as a function of the modulation of the reactivation airflow.

* * * * *